(12) United States Patent  (10) Patent No.: US 7,714,740 B2
Lipman  (45) Date of Patent: May 11, 2010

(54) AUTOMATIC MONITORING OF ANALOG GAUGES

(75) Inventor: Aharon Lipman, Michmoret (IL)

(73) Assignee: Lipman Science and Technology, Ltd., Rosh Ha' Ayin (IL)

( * ) Notice: Subject to any disclaimer, the term of this patent is extended or adjusted under 35 U.S.C. 154(b) by 391 days.

(21) Appl. No.: 11/792,413

(22) PCT Filed: Dec. 6, 2005

(86) PCT No.: PCT/IL2005/001313

§ 371 (c)(1),
(2), (4) Date: Jun. 6, 2007

(87) PCT Pub. No.: WO2006/061830

PCT Pub. Date: Jun. 15, 2006

(65) Prior Publication Data

US 2008/0048879 A1    Feb. 28, 2008

(30) Foreign Application Priority Data

Dec. 7, 2004    (IL)    ................................... 165614

(51) Int. Cl.
 *G08B 21/00*    (2006.01)

(52) U.S. Cl. .................. 340/688; 340/686.1; 340/686.2; 340/686.3; 340/441

(58) Field of Classification Search ....................... None
See application file for complete search history.

(56) References Cited

U.S. PATENT DOCUMENTS

| 3,909,780 | A  | * | 9/1975 | Huffman ..................... 340/463 |
| 4,016,536 | A  | * | 4/1977 | La Chapelle ................ 340/441 |
| 6,742,396 | B2 | * | 6/2004 | Schenk, Jr. .................... 73/735 |
| 2003/0011470 | A1 | * | 1/2003 | Cohen ..................... 340/425.5 |
| 2008/0018488 | A1 | * | 1/2008 | Struck et al. ........... 340/815.86 |

FOREIGN PATENT DOCUMENTS

FR    0423 104 A1  *  4/1991

* cited by examiner

*Primary Examiner*—Julie Lieu
(74) *Attorney, Agent, or Firm*—JMB, Factor & Co.

(57) ABSTRACT

A digital monitoring device for monitoring an analog gauge including a pointer, the digital monitoring device comprising: a pixilated optical sensor array for mounting over the analog gauge to generate a digital signal corresponding to movement of the pointer; an image processing means for reading the pointer of the analog gauge from the electrical signals from the pixilated array, and an alert output for outputting an alert corresponding to pointer exceeding acceptable boundaries.

43 Claims, 20 Drawing Sheets

AUTOMATIC MONITORING OF ANALOG GAUGES

FIELD OF THE INVENTION

The present invention relates to a monitoring device and method for monitoring an analog meter using an image sensor, and for providing alerts in response to the output of the sensor.

BACKGROUND

Analog gauges, otherwise known as meters or "clocks" have a pointer that sweeps across a dial in response to a monitored parameter. In time clocks, the hour hand of an analog clock goes around the clock face as the Earth rotates around its axis, or, from the viewer on Earth, as the Sun crosses the heavens.

In vehicles, for example, analog gauges that resemble clocks include fuel and temperature gauges, rev counters, speedometers, and the like. In such analog gauges, a needle or pointer moves across a linear scale, between a first extreme indicative of zero, signifying that the measured parameter is zero, be it an empty fuel tank, a cold engine, zero rev (revolution, i.e. pumping cycle of crankshaft) or zero speed, and a second extreme, or full scale deflection, that is indicative of full fuel tank, over heated engine, dangerously high revs, maximum speed, and the like.

Analog gauges are also used in airplanes and boats, and are also widely used in industry, to monitor temperature, pressures, flow rates and the like.

With reference to an analog vehicle speedometer, using such a gauge to visually monitor the speed of a vehicle may have many disadvantages. For example, if the driver looks at the speedometer to monitor his speed rather than concentrating on occurrences on the road, the driver is at least momentarily distracted and does not pay full attention to events happening on the road. The likelihood of an accident is increased. The process of repeatedly looking down at the various gauges, even if it is done only intermittently, is a wearing task and contributes to fatigue, especially on long rides. However, drivers who do not check the speed of their vehicle frequently may exceed the speed limit, or safe driving speeds. A driver inadvertently relaxing while driving might press more heavily on the accelerator pedal or reducing pressure, thereby increasing or decreasing the speed of the vehicle, without any warning being activated on such occasions. An alert such as an audible alarm noise, or some other indication regarding a velocity exceeding a predefined limit is, therefore, of great importance, and it will thus be appreciated that monitoring such clocks and gauges automatically and providing an audible or visual alert may improve driving safety, would help the driver to stay alert, improve confidence and keep driver focused on the road.

There is therefore, a need for a practical implementation of a device or system for monitoring gauges such as speedometers. Such an implementation should be retrofittable and should avoid interfering with the mechanical components of the vehicle, both to avoid damage and to prevent affecting the vehicle's warranty and/or insurance.

Prior art devices apparently do not satisfactorily address the problems involved in such systems. For example:

U.S. Pat. No. 6,748,322 to Fernandez, entitled "Speed monitoring device for motor vehicles" relates to a system for monitoring the speed and location of a vehicle over a given area by using a global positioning system and comparing the position fix and speed against a computerized map for the area containing predetermined limits for the speed and territory over predetermined times and days of the week. If a limit is exceeded the position fix and speed information is stored along with the time when it took place. The stored information can be optionally transmitted to a remote location for further processing. Also, alarm circuits are provided inside the vehicle to selectively alert the occupants that a limit has been exceeded.

U.S. Pat. No. 6,728,605 to Lash et al., entitled "Vehicle speed monitoring system and method" relates to a vehicle speed monitoring device which enables a driver to enter a speed tolerance profile that represents the driver's personal travel speed preferences and which alerts the driver when the vehicle speed falls outside the speed tolerance profile. Specifically, the speed tolerance profile consists of a number of speed tolerance ranges, each associated with a particular posted speed limit. As the vehicle travels through various map zones, the applicable posted speed limit is determined using a customized GPS map. The device determines the vehicle location, speed and the posted speed limit and then compares the vehicle speed using a running average to see whether vehicle speed is within the driver's speed tolerance profile, and, if not, the device provides the driver with a visual and/or audible warning according to the driver's operational preferences.

U.S. Pat. No. 6,515,596 to Awada, entitled "Speed limit display in a vehicle" relates to a method and apparatus for reporting a posted speed limit to the driver of a vehicle. The position of the vehicle is determined using a GPS receiver or triangulation of cellular telephone signals. The position is used to retrieve speed limit or other information from a database. The information is then reported to the driver. A technique is also disclosed for comparing the actual speed of the vehicle with the posted speed limit and issuing a warning to the driver when the posted speed limit is exceeded. All the above systems rely on GPS technology and can only work where GPS is supported.

U.S. Pat. No. 4,095,553 to Ono et al., entitled "Speedometer with an exceeding speed warning device" describes a lever fixed to a metal cap or speed cup of a speedometer that is vibratably engageable with projections provided on a rotating ring member when a speed pointer rotatable with the metal cap deflects beyond a predetermined maximum index, so that the speed pointer is vibrated to give a warning to the vehicle driver. The device described is a speedometer that might be provided with a vehicle, or retrofitted by a skilled mechanic to an existing vehicle, in lieu of the speedometer provided. It is not a device that can be easily retrofitted by a driver. The device does not address the issue of such gauges being distracting to the driver.

U.S. Pat. No. 3,980,041 to Evans, entitled "Speedometer with speed warning indicator and method of providing the same" describes an improved speed warning indicator for a speedometer comprises a transparent plate such as a transparent decal, having means such as an attached transparent plastic sheet bearing adhesive for attaching it to the transparent face cover of a speedometer casing containing a speedometer dial. The plate bears indicia, such as color and/or a plurality of spaced lines, etc. demarking the plate and the speedometer dial viewed through the plate, thereby indicating a speed warning on the dial while still permitting unobstructed viewing of all of the dial. Preferably, the plate is configured and dimensioned to overlie only a portion of the cover and dial so as to more clearly provide the speed warning. The plate can be affixed, in accordance with the present method, to the face cover of a fully assembled speedometer so as to provide very easily, simply and effectively, the improved speedometer of the invention. Though perhaps making the display of the speedometer easier to read, such a device has all the limitations of conventional speedometers, described hereinabove.

UK Patent Application No. 2,384,603 to Matharu, entitled "A speed alert device" describes a stick-like speed alert device that may be attached to the clock glass of a speedometer using vacuum suckers. The device includes a battery (dry cell), a proximity sensor and a buzzer and provides a buzzing noise when it detects that the needle (pointer) of the speedometer passes therebeneath. The device lacks enablement in that no explanation is given of how the proximity sensor senses a speedometer needle in its proximity. Additionally, such a tall protrusion extending from the speedometer, may, in itself, be a distraction to the driver, particularly since, of necessity, it is mounted off center, and ruins the symmetry of the dashboard.

U.S. Pat. No. 6,094,615 to Park, entitled "Speed limit control system and method for vehicles" describes a speed limit control system and method for vehicles, which can control both the amount of fuel injection and ignition timing of an engine so as to restrict speed more than a regulation speed. The system includes a vehicle speed sensor for generating electronic signals in accordance with an actual vehicle speed; a control device for judging the actual vehicle speed in accordance with signals from the vehicle speed sensor, outputting control signals for controlling ignition timing of an engine and the amount of the fuel injection in accordance with the speed variation in order not to exceed a predetermined regulation speed; an ignition device for igniting at a predetermined timing by signals, the signals being transferred from the engine control device; and an injection device for injecting the predetermined amount of fuel by signals, the signals being transferred from the engine control device. The system described monitors the revolution of the wheels of the vehicle directly using a magnetic sensor means and directly controls the speed. Such a system is expensive and limiting to the driver, and is difficult to override.

Dutch Patent Number NL 1008348C to George et al. entitled "an accessory for a vehicle speedometer" describes a retrofittable accessory that is attachable to the transparent cover plate of the speedometer by a suction pad. The accessory is positioned over the axis of rotation of the speedometer needle. The sensor is fitted to the end of a hinged radial carrier that is aligned with the required speed graduation and is then clamped. If the needle passes under the sensor, the sensor output triggers a circuit which produces an audible waning, which may be spoken message, such as "too fast". The sensor may be moved from one position to another, but this has to be done manually. Such a system is good to set at the speed-limit before motorway cruising, for example, but cannot be readily used for providing appropriate warnings on different roads, such as in-town, inter-city and motor way.

U.S. Pat. No. 5,659,290 to Haeri, entitled "Speed minder", relates to a universal device for vehicles which measures the speed of the vehicle and continuously displays the speed on a digital readout display located in the vicinity of the dashboard of the vehicle. A separate digital switch integrated into the circuitry of the device is used to pre-set a reference speed to a desired value. As the vehicle's actual speed exceeds this pre-set reference value, a buzzer sounds and/or the speed display flashes off and on to alert the driver that he has exceeded the pre-set speed. When the vehicle speed falls below the pre-set limit, the buzzer and flashing stops and the device acts as a regular digital speedometer. The device is adjustable, thus enabling it to be used on a wide variety of vehicles.

Haeri's sensing means is a magnetic proximity sensor that comprises a reed switch sensor surrounded by a non-magnetic metal sleeve, made, for example, from copper, aluminum, etc. The sensor requires that the pointer of the speedometer be ferro-magnetic. For weight minimization, such pointers are, however, frequently plastic or aluminium.

French Patent 9504565 to Bruch, entitled "Avertisseur de vitesse" and French Patent 89 13871 to Poulain, entitled "Procede de detection du positionnement relatif d'un indicateur a aiguille, et dispositif electronique permettant de la mettre en oeuvre" both describe sensors for sensing the position of the needle of a speedometer. Apparently a light source is provided for illuminating a spot thereunder, and the passage of the needle is detected by a change in the signal.

The sensors described by Haeri, Bruch and Poulain, like many others described hereinabove, are capable of providing simple yes/no information regarding passage of a pointer thereunder, and does not allow tracking of the pointer, or monitoring at two speeds, for example.

U.S. Pat. No. 5,554,970 to Mottahedeh, entitled "Speed alert system for an automobile" describes a speed alarm system for an automobile comprised of a first circular disk having a semi-circular electronic indicator grid formed around an outer periphery thereof. The first circular disk is rotatably positioned on a speedometer relay of an automobile and coupled thereto by a knob portion. A second circular disk has a circular recess formed therein inwardly of an outer periphery thereof. The second circular disk is positionable through an upper portion of the knob portion whereby the semi-circular electronic grid of the first circular disk is in selective alignment with the circular recess of the second circular disk. An indicating needle has a first end rotatably coupled with the upper portion of the knob portion. A second end has a magnetic portion extending downwardly through the circular recess of the second circular disk. A speaker has wiring extending outwardly thereof to couple with the existing speedometer relay of the automobile and with the semi-circular electronic grid of the first circular disk. The device to Motadeh appears to be a replacement for the traditional speedometer, requiring fitting by a skilled mechanic.

GB Patent No. 2,360,582 to Herrington, entitled "Vehicle excessive speed monitor" describes a monitor for warning a driver of excessive speed or revs. The monitor has a light source in a housing that is attached to the clear screen above a vehicle instrument panel by adhesive or suction cups. Behind the light source is the monitoring circuitry, a battery, and an audible warning device that produces an audible tone to alert the driver when the light beam is broken by the speedometer or rev counter needle. The monitor is detachable and may be positioned for a particular speed limit, e.g. 30 mph.

U.S. Pat. No. 6,600,409 to Cohen, entitled "Signaling self-contained add-on accessory for an analog metering device such as a speedometer and secondary device" relates to a self-contained accessory for an analog metering device such as a speedometer or tachometer. The accessory includes a sensor which is selectively adjustable to align with a plurality of positions in the range of movement of an output needle of the analog metering device. In the preferred embodiment, the sensor is alignable with gradation marks, e.g., miles per hour indicia on a speedometer, and the accessory provides a signal when a needle reaches a selected gradation. The signal is sent to a secondary device, such as a radar detector or central monitoring system. The signal may also be used to provide an indication that alerts a user that a selected gradation has been reached by an output needle of the analog metering device. The accessory attaches to a cover of the analog metering device and allows adjustment of sensor position without removal of the accessory from the cover. A preferred radar detector uses the signal to effect a modified operation where some functions of the radar detector are responsive to the signal of the accessory. The device described is essentially a self-contained add-on accessory for an analog metering device, that has a needle with a sensor that detects the alignment of the needle of accessory with needle of metering device.

U.S. Pat. No. 6,310,544 to Cohen, entitled "Self-contained add-on accessory for an analog metering device such as a speedometer or tachometer" relates to a self-contained add-on accessory for an analog metering device having a moving needle as an indicator of a measured output parameter, the accessory comprising: a housing dimensioned to fit on a portion of a cover of the analog metering device without obscuring gradation marks on a face of the analog metering device; a selectively adjustable member extending from the housing and alignable with a plurality of different gradation marks on the face of the analog metering device; a sensor mounted in associated with said selectively adjustable member to detect when an output needle of the analog metering device reaches a gradation on the face of the analog device with which said selectively adjustable member has been aligned; and a power source within said housing for powering said sensor.

Despite the crowded art, there is still a need for a device for automatically reading analog gauges such as speedometers, and the present invention addresses this need.

SUMMARY OF THE INVENTION

The present invention is directed to providing a digital monitoring device for monitoring an analog gauge including a pointer, the digital monitoring device comprising: a pixilated optical sensor array for mounting over the analog gauge to generate a digital signal corresponding to position of the pointer; a processing means for reading the position of the pointer of the analog gauge from the electrical signals from the pixilated array, and an alert output for outputting an alert corresponding to pointer exceeding acceptable boundaries.

Typically the digital monitoring device further comprises a power source for powering the pixilated optical sensor array, processing means and alert output.

Typically the digital monitoring device further comprises an attaching means for attaching the digital monitoring device to the window of the analog gauge. Such an attaching means may be selected from the list of vacuum suckers, glues, adhesive tapes, screws, bolts, rivets and the like.

Typically the digital monitoring device further comprises a directing means for the pixilated optical sensor array to image the pointer of the gauge.

Typically the digital monitoring device further comprises a directing means for varying angle of tilt between the pixilated array with respect to the needle of the analog gauge.

Typically the digital monitoring device further comprises a means for locating the digital monitoring device over the pivot of the pointer of the analog gauge.

Optionally the digital monitoring device further comprises a directing means and a display for facilitating installment, adjustment and calibration of the digital monitoring device; such a display for providing an indication of alignment selected from the list of audio and visual indications.

Optionally the pixilated array is a rectangular array of pixels. Alternatively, the pixilated array comprises pixels arranged in at least one curved row. Typically the pixilated array comprises a CMOS device.

Preferably the device further comprises an optical lens for focusing, or at lest projecting the light signal from the analog gauge onto the pixilated array.

Optionally and preferably the image processing means comprising a DSP.

Optionally and preferably the image processing means comprises a threshold value storage means and a decision means for generating an output responsive to movement of said pointer.

Optionally and preferably the processing means includes a storage means for storing a plurality of threshold values and decision means for activating an output responsive to the pointer.

Optionally the digital monitoring device further comprises a light source, wherein calibration and alignment of the digital monitoring device is facilitated by position of light from said light source reflected from said analog gauge.

Preferred embodiments of the digital monitoring device further comprise an input means for calibration thereof by inputting thresholds. Optionally the threshold values are settable using pushbuttons on the device. Alternatively, the threshold values are set to be equal to the location of the pointer.

In one embodiment threshold values are set by projecting a light spot at the analog gauge.

Preferred embodiments may further comprise a transceiver coupled to a data-link and the threshold values are remotely entered over the data-link.

The digital monitoring device may further comprise a microphone for activation by an audible activation system.

The digital monitoring device may further comprise ON/OFF controls.

The digital monitoring device may further comprise a rotatable LED for illuminating the analog gauge for calibration and setting sector limits.

The digital monitoring device may further comprise means for updating limits of pointer corresponding to allowable range of monitored parameter using a communication channel.

The digital monitoring device may further comprise output signal selected from the list of audible alarms, visual indications and spoken word.

The output signal of the digital monitoring device may, in the various embodiments, be outputted by an electronic signaler selected from the list of LEDs, LCDs and buzzers.

In one embodiment, the digital monitoring device may be connected to the automotive system of a vehicle to serve as a passive cruise control system.

In one embodiment, the digital monitoring device further comprises a transceiver and a data link.

In one embodiment, the digital monitoring device further comprises means for reaching a decision regarding activation of the transceiver.

The digital monitoring device may further comprise a memory and a means for reaching a decision regarding the storage of data in said memory.

The alert output of the device may be activated for a fixed predefined time period, or, the alert may operate for as long as long as the pointer is above a minimum threshold.

The digital monitoring device may monitor the rate of movement of the pointer for monitoring the derivative of the monitored parameter with respect to time, for calculating acceleration data from a speedometer, for example.

In preferred embodiments, the digital monitoring device may further include a thermometer, and may include a cutoff for stopping operation of the device if the temperature recorded by the thermometer exceeds an allowable range defined by preset limits.

The digital monitoring device may include a device identification code, perhaps related to the registration number of a host vehicle. The identification code may be encrypted.

The digital monitoring device may include a means for monitoring its location with respect to the analog gauge.

The movement of the needle of the monitored analog gauge past a set point may cause the digital monitoring device to perform a self testing routine that includes a battery test.

The digital monitoring device may include power saving means, optionally including at least one of the list of: (a) means for changing scan rate to use a slower rate when the pointer indicates that the monitored parameter is distanced from preset threshold value; (b) a variable rate of image scan and signal processing; (c) means for entering a low power consumption mode of the device when the pointer of the analog gauge is not monitorable; (d) entering a low power consumption mode when ambient light is below a minimum threshold; (e) a vibration, movement or acceleration sensor for switching device on and off.

Throughout the present disclosure, although the invention may be presented by way of example with reference to a speedometer or other specific device, it is to understood that the invention equally applies to various analog meters.

BRIEF DESCRIPTION OF THE FIGURES

For a better understanding of the invention and to show how it may be carried into effect, reference will now be made, purely by way of example, to the accompanying drawings.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention; the description taken with the drawings making apparent to those skilled in the art how the several forms of the invention may be embodied in practice.

In the accompanying drawings:

FIG. 1 is a side view of the analog gauge monitoring device of the invention mounted in front of a speedometer;

FIG. 2 is a functional block diagram of the analog gauge monitoring device;

FIG. 3 shows the analog gauge monitoring device installed in front of the speedometer;

FIG. 4 illustrates possible alarm scheduling and triggering events;

Figure 5:
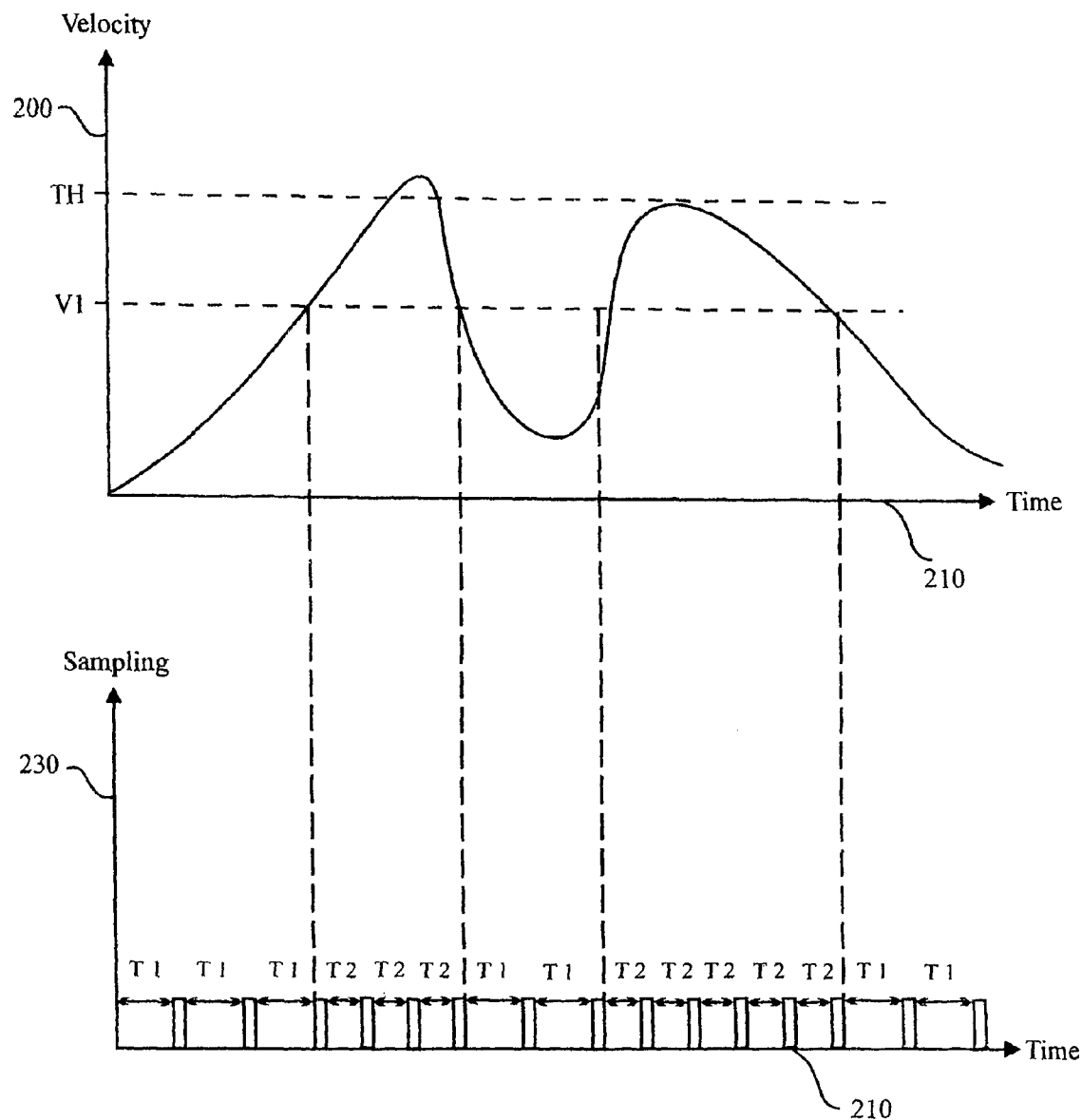
Figure 6:
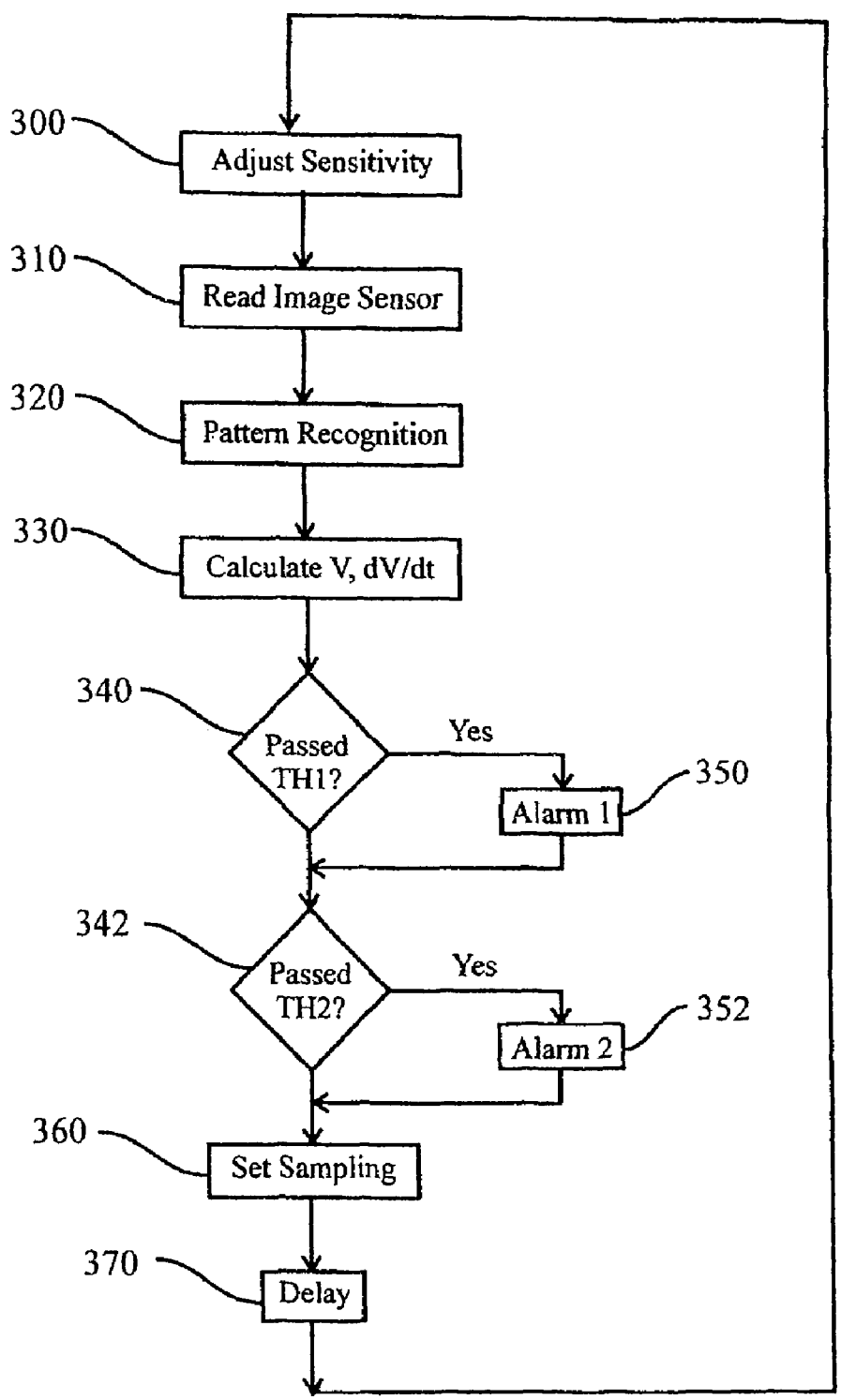
Figure 7:
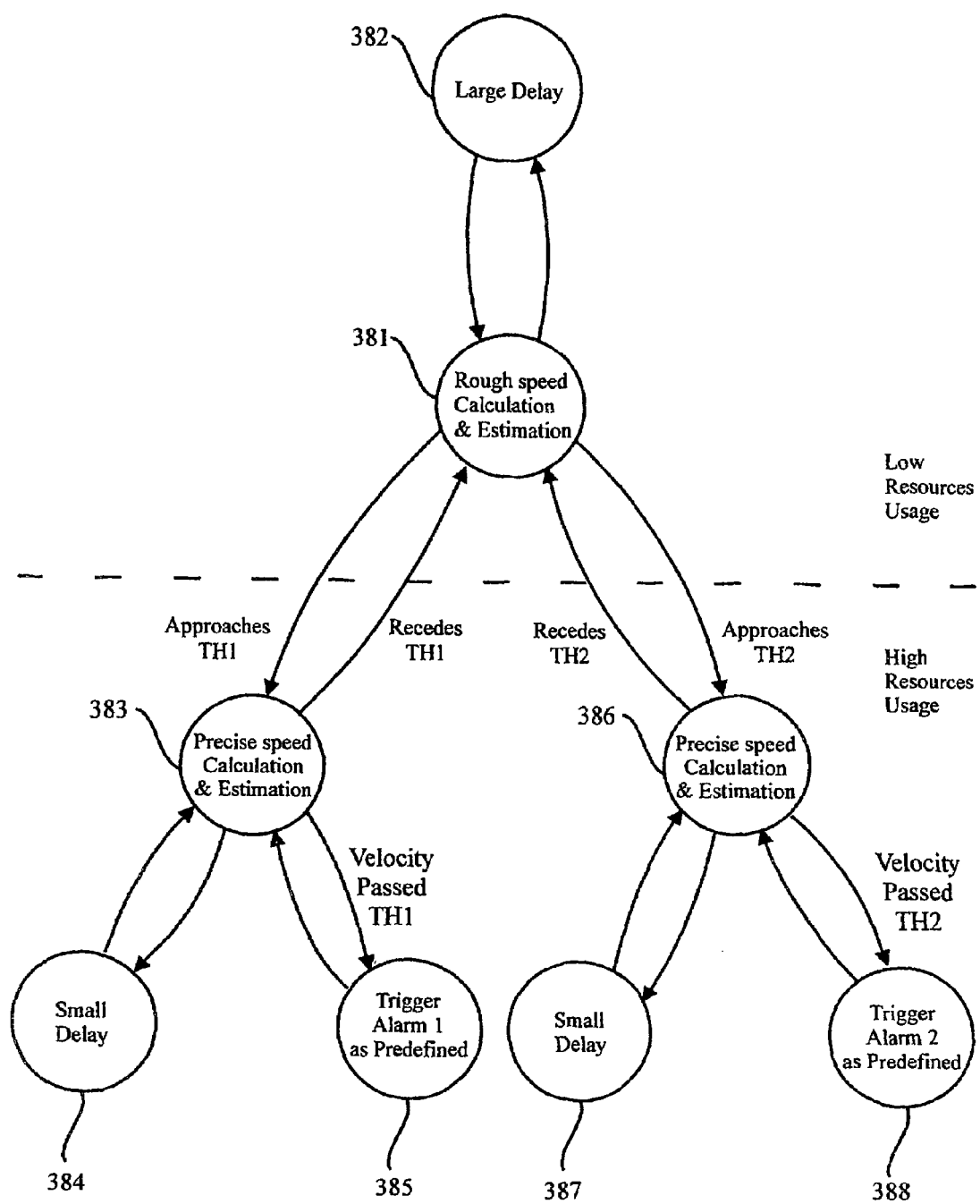
Figure 8:
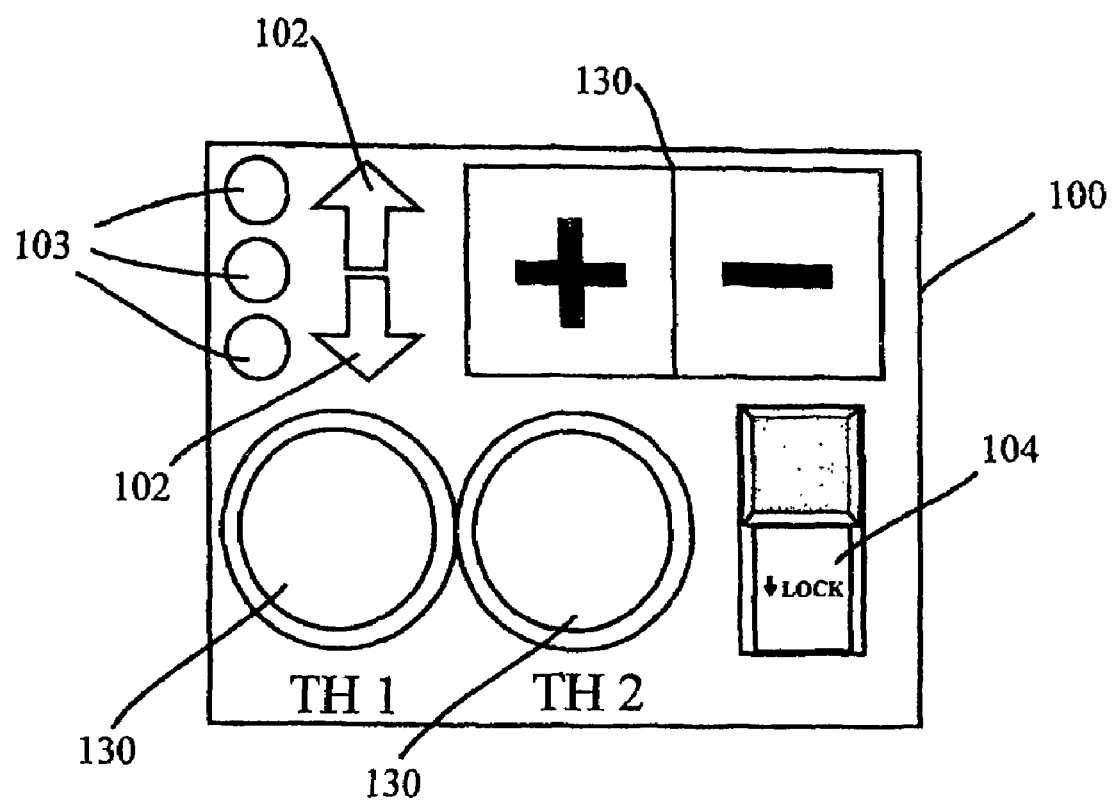
Figure 9:
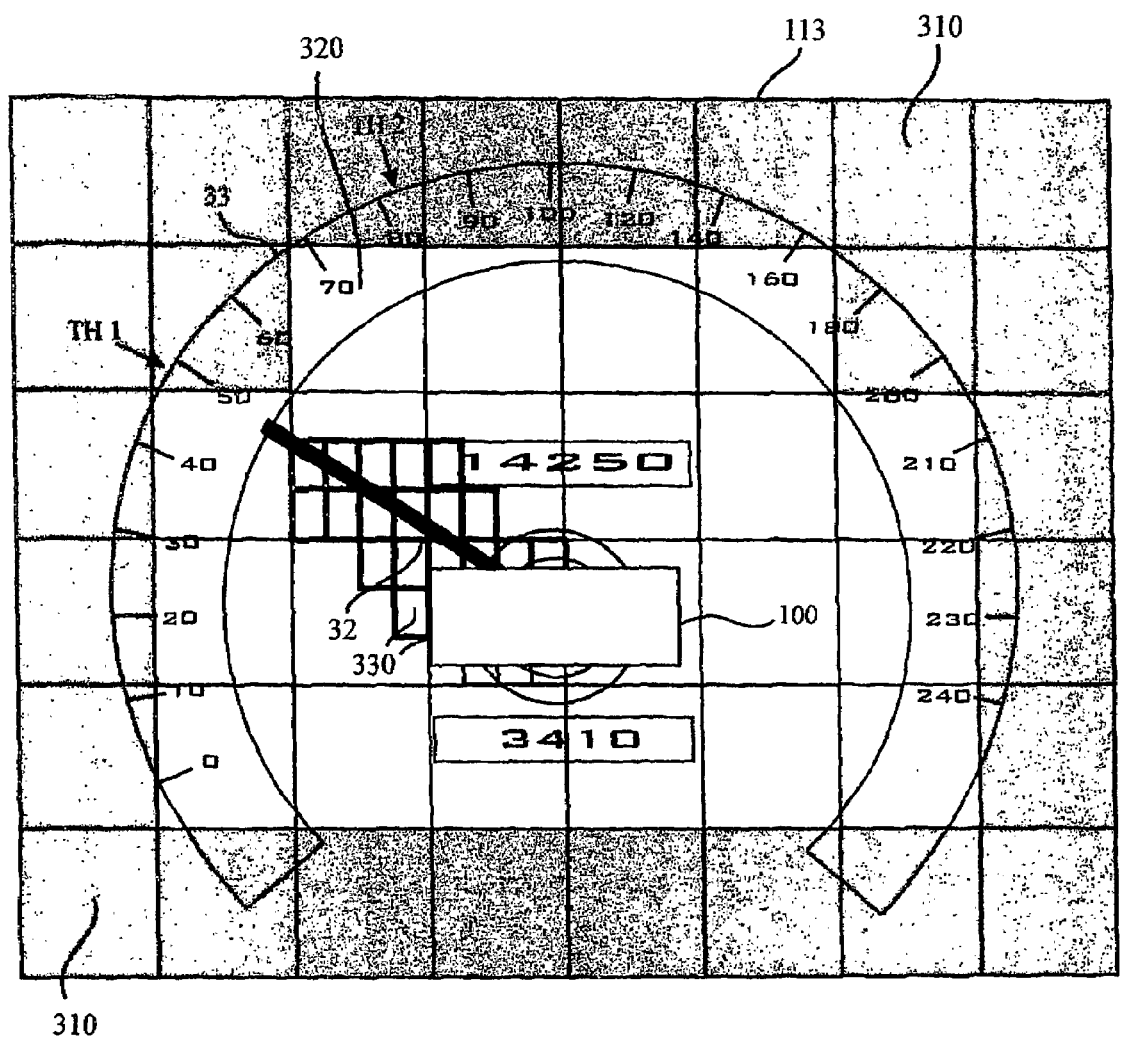
Figure 10:
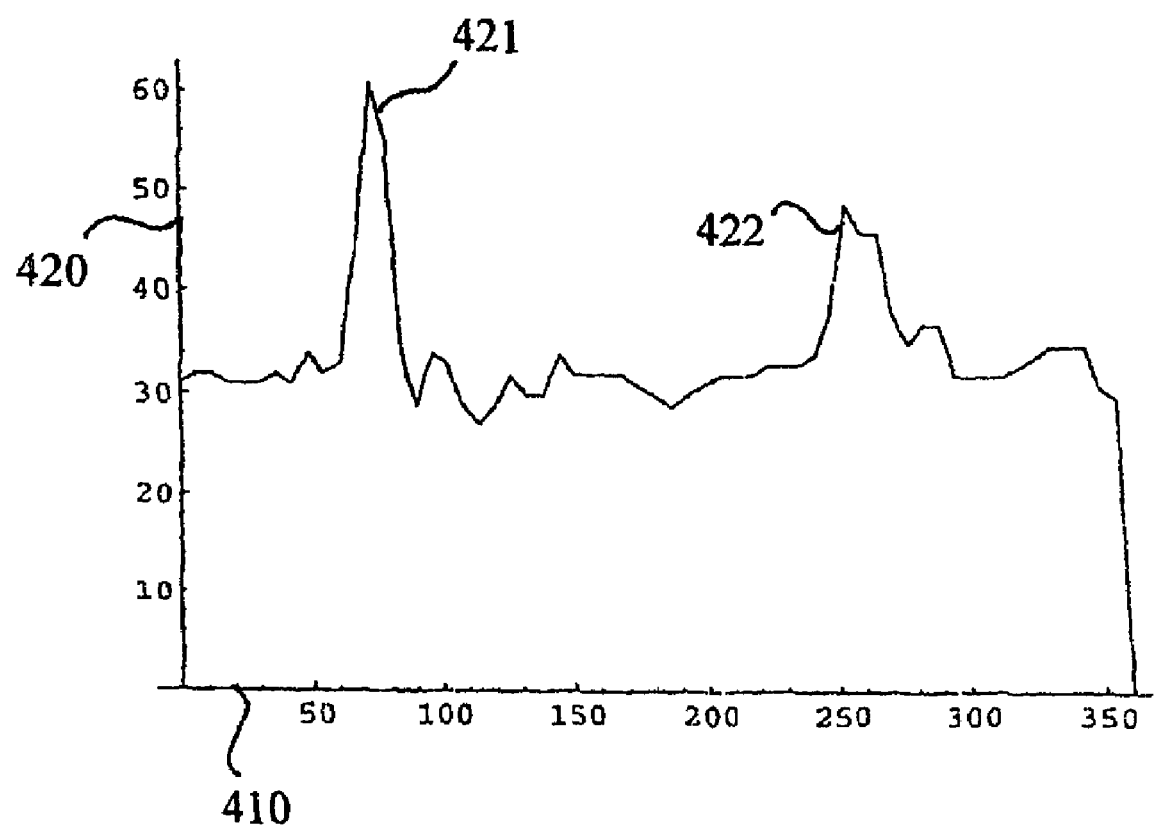
Figure 11:
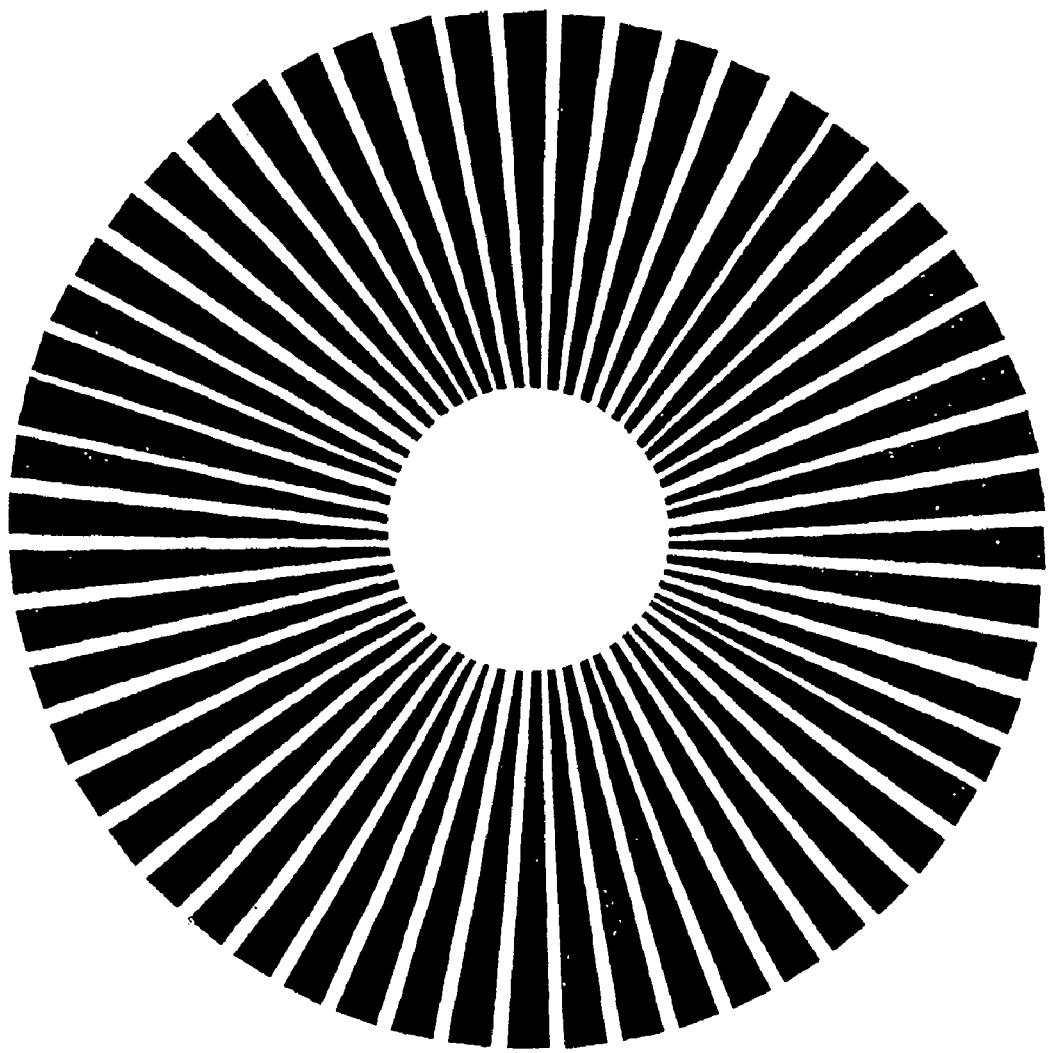
Figure 12:
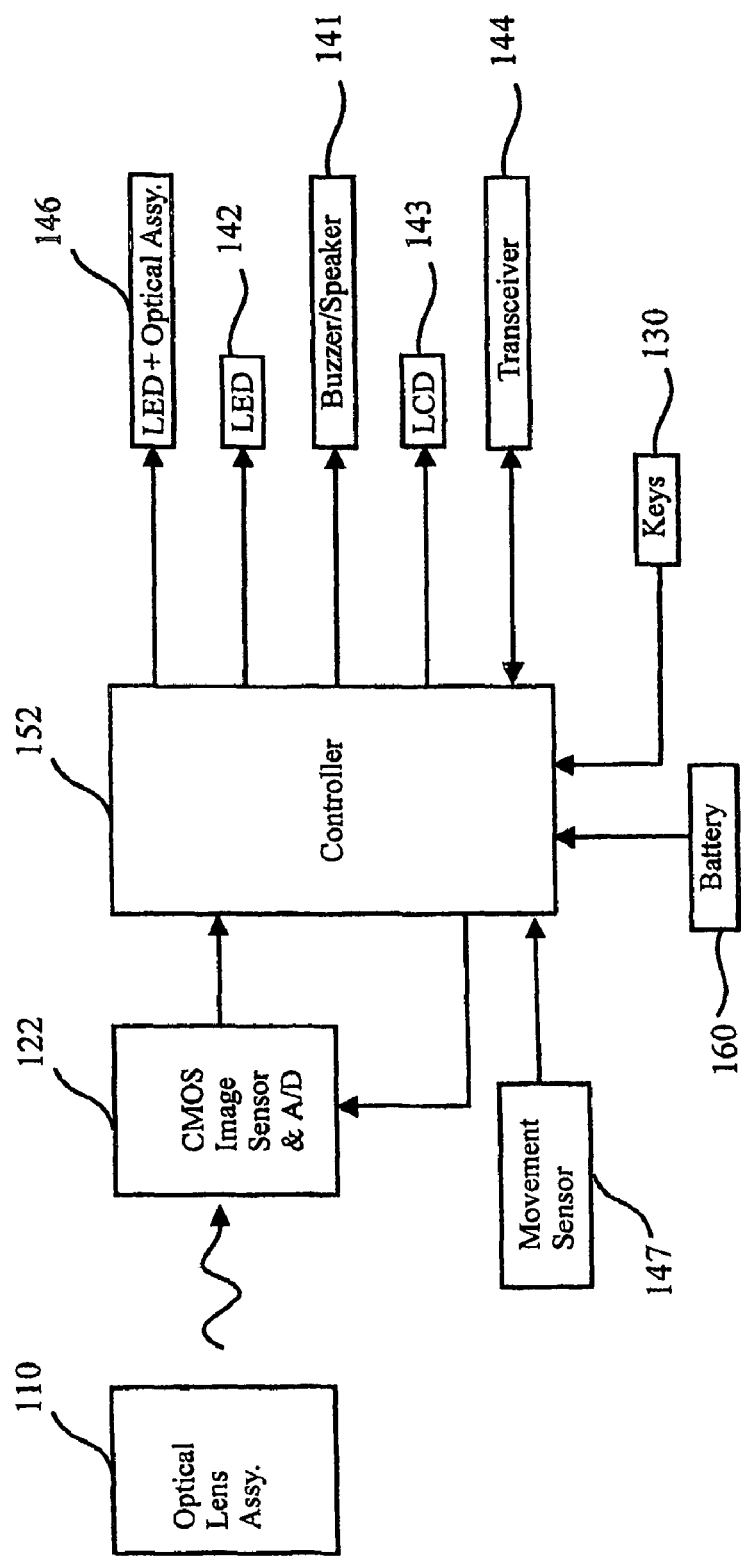
Figure 13:
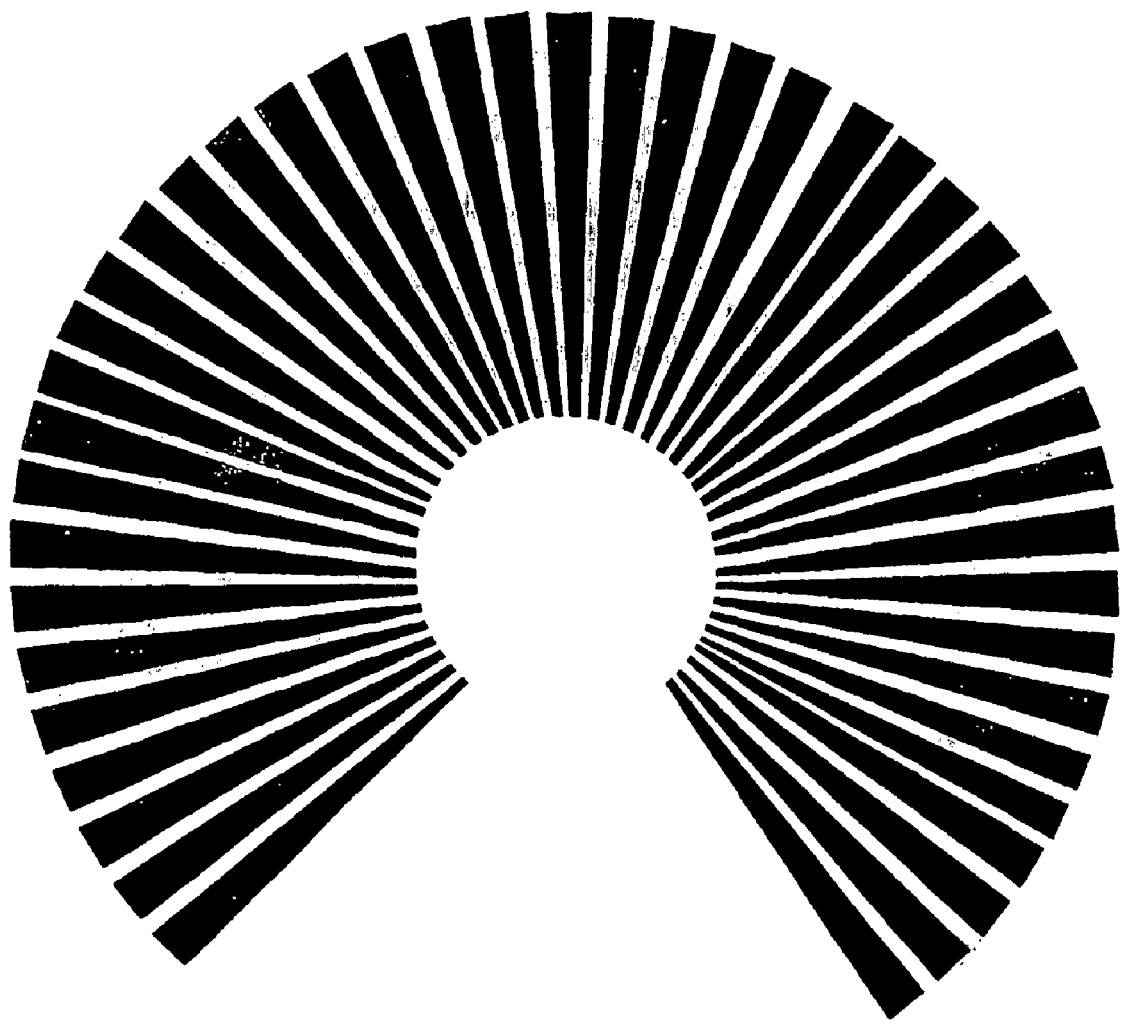
Figure 14:
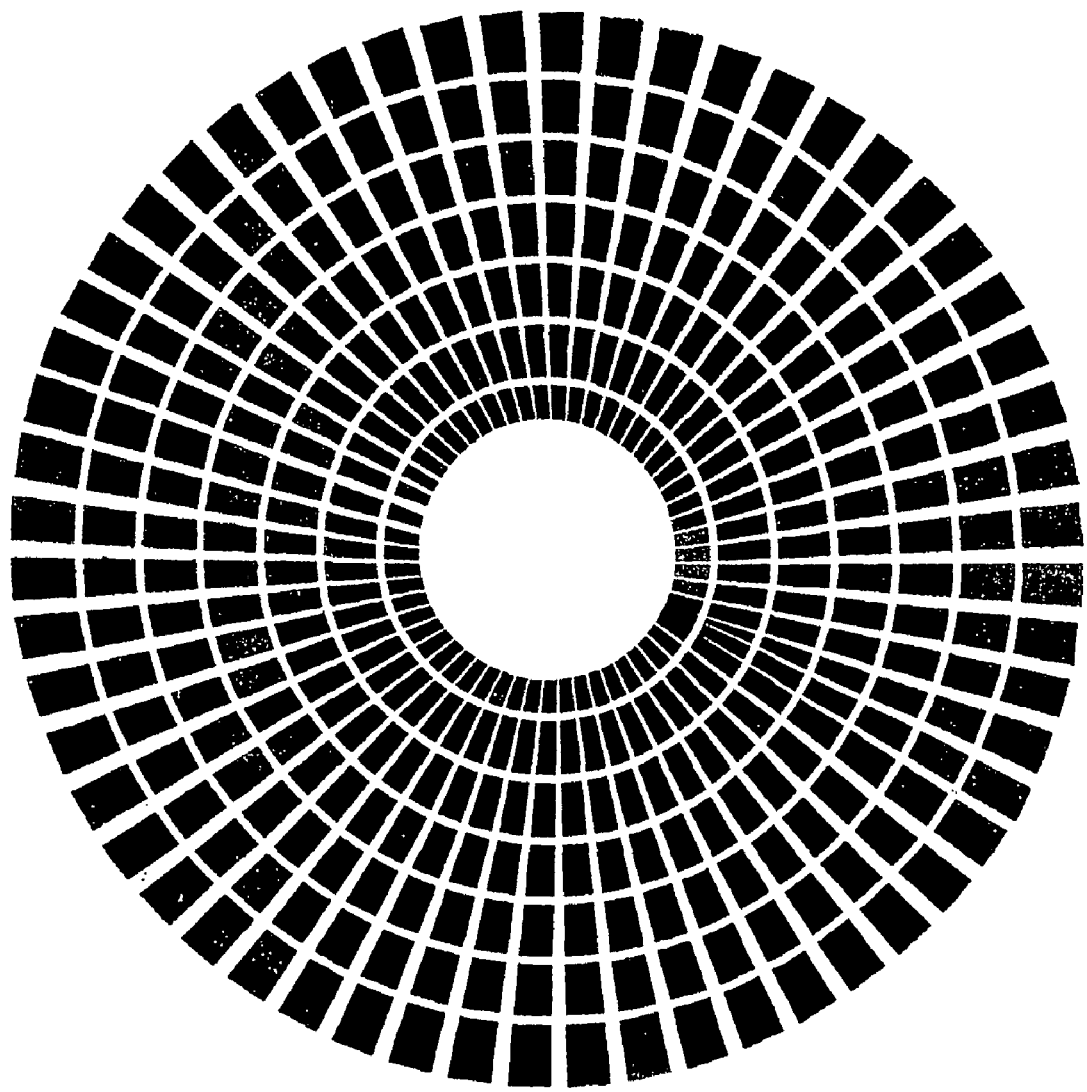
Figure 15:
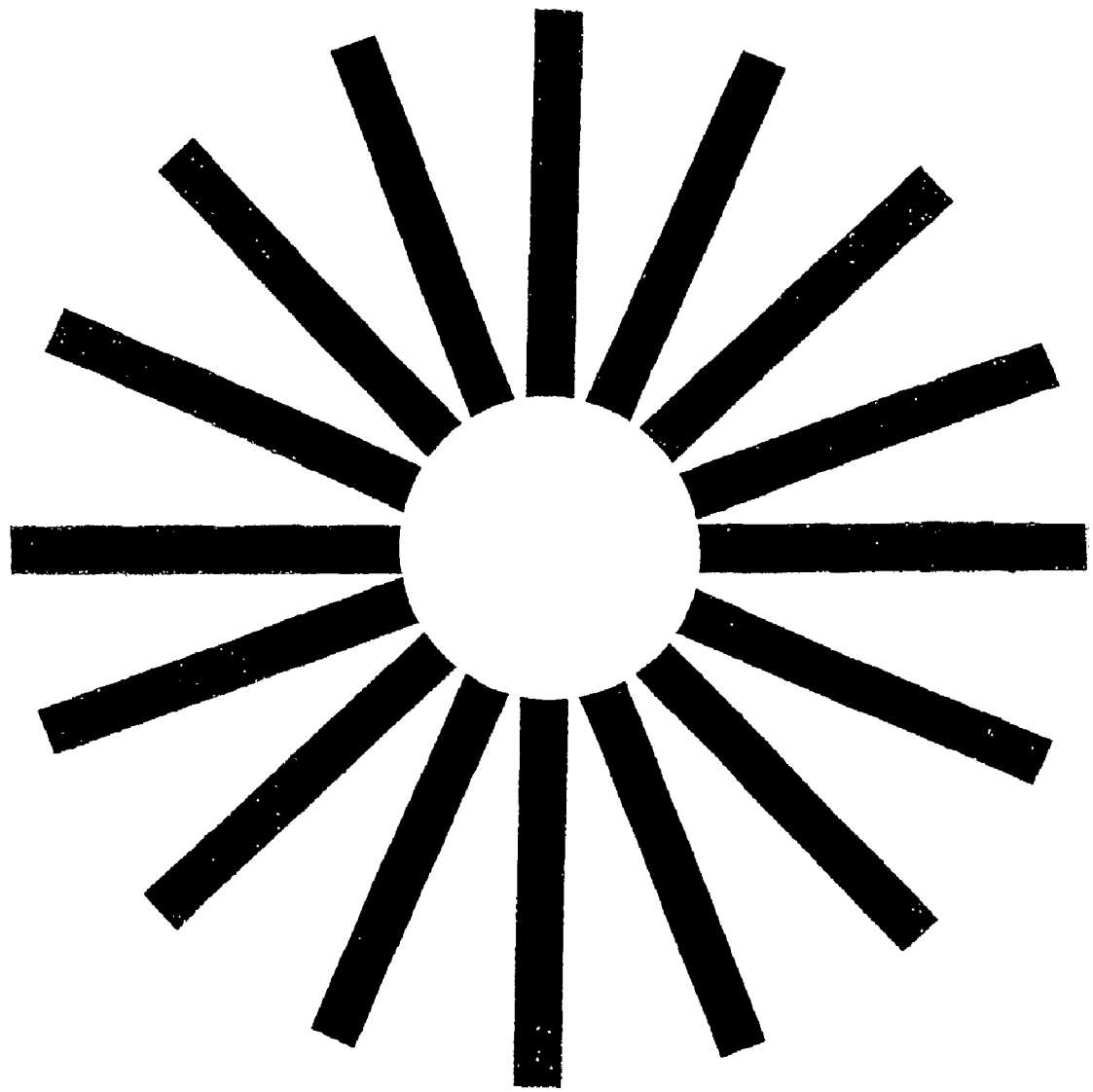
Figure 16:
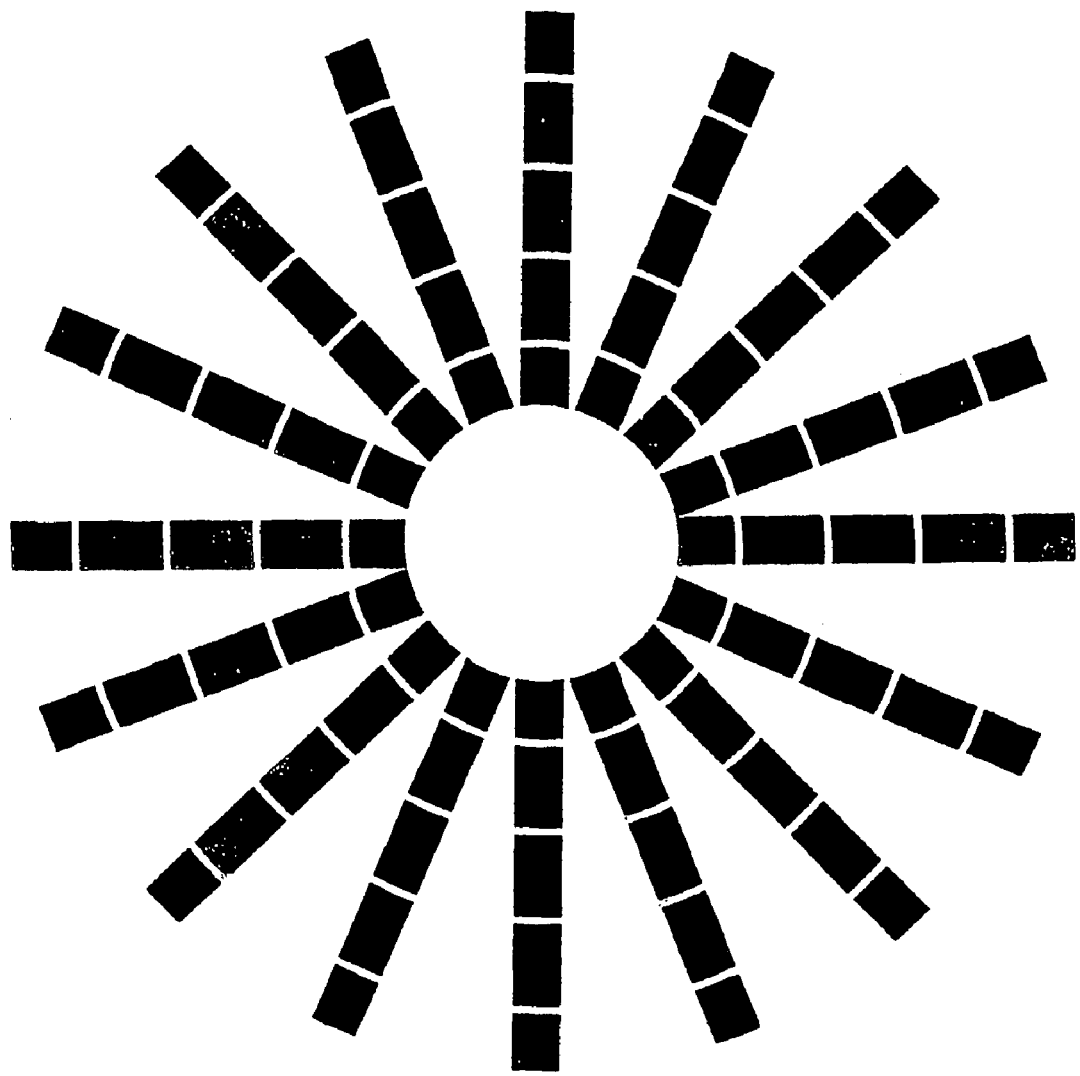
Figure 17:
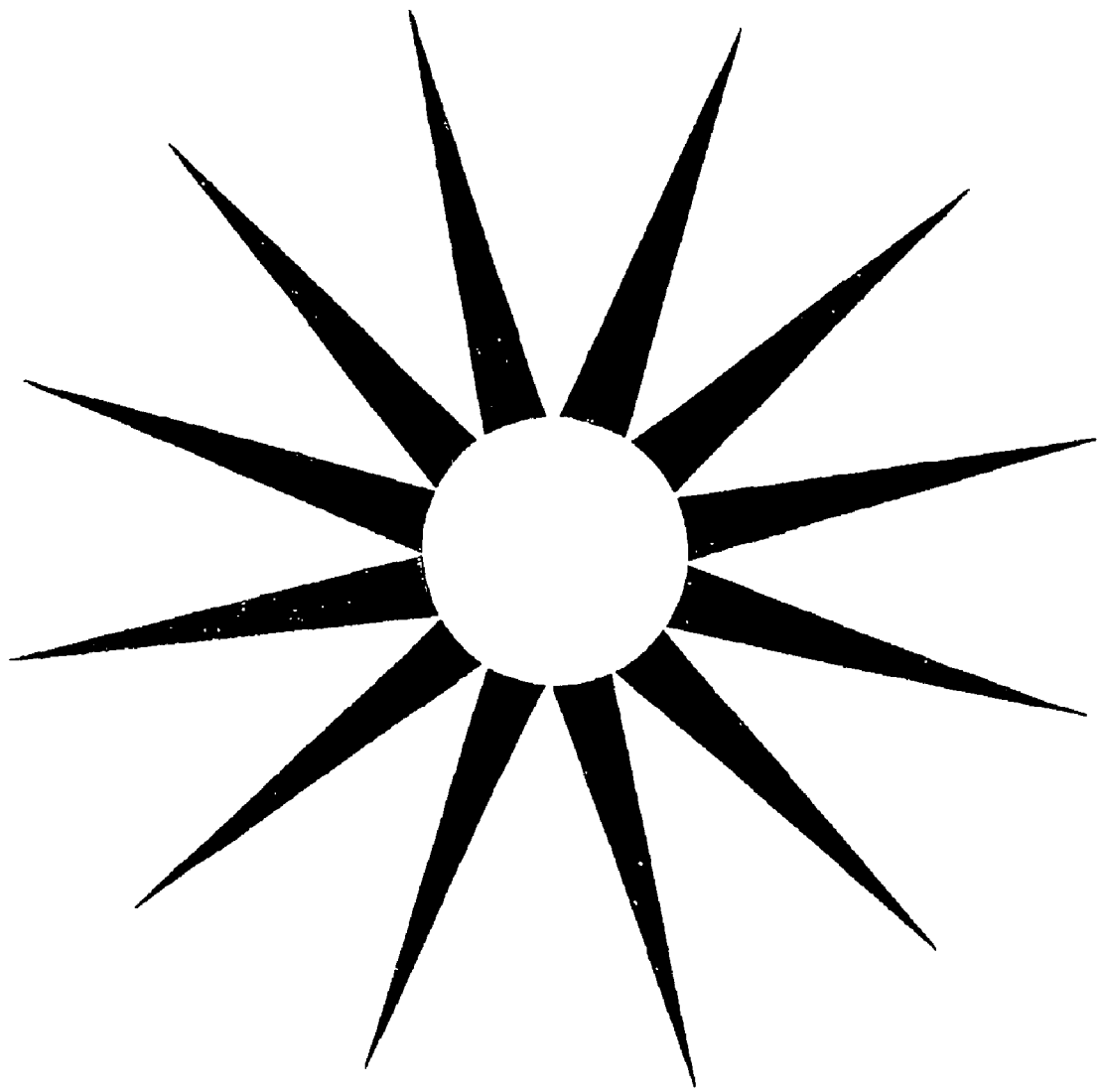
Figure 18:
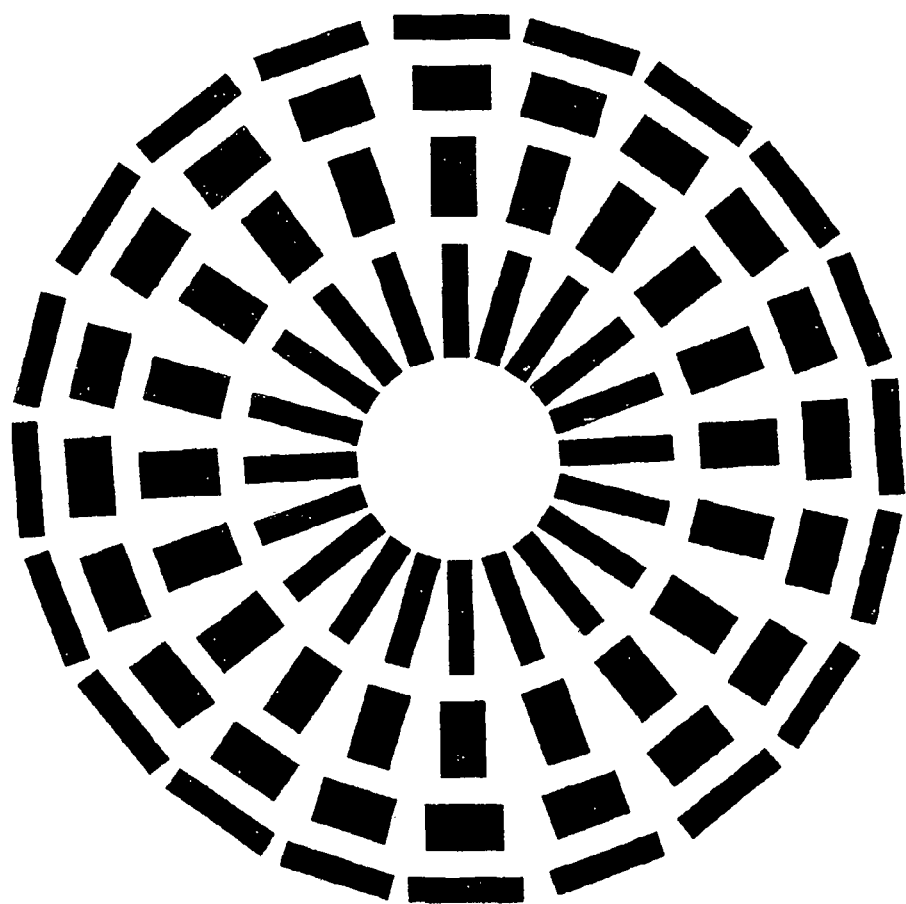
Figure 19:
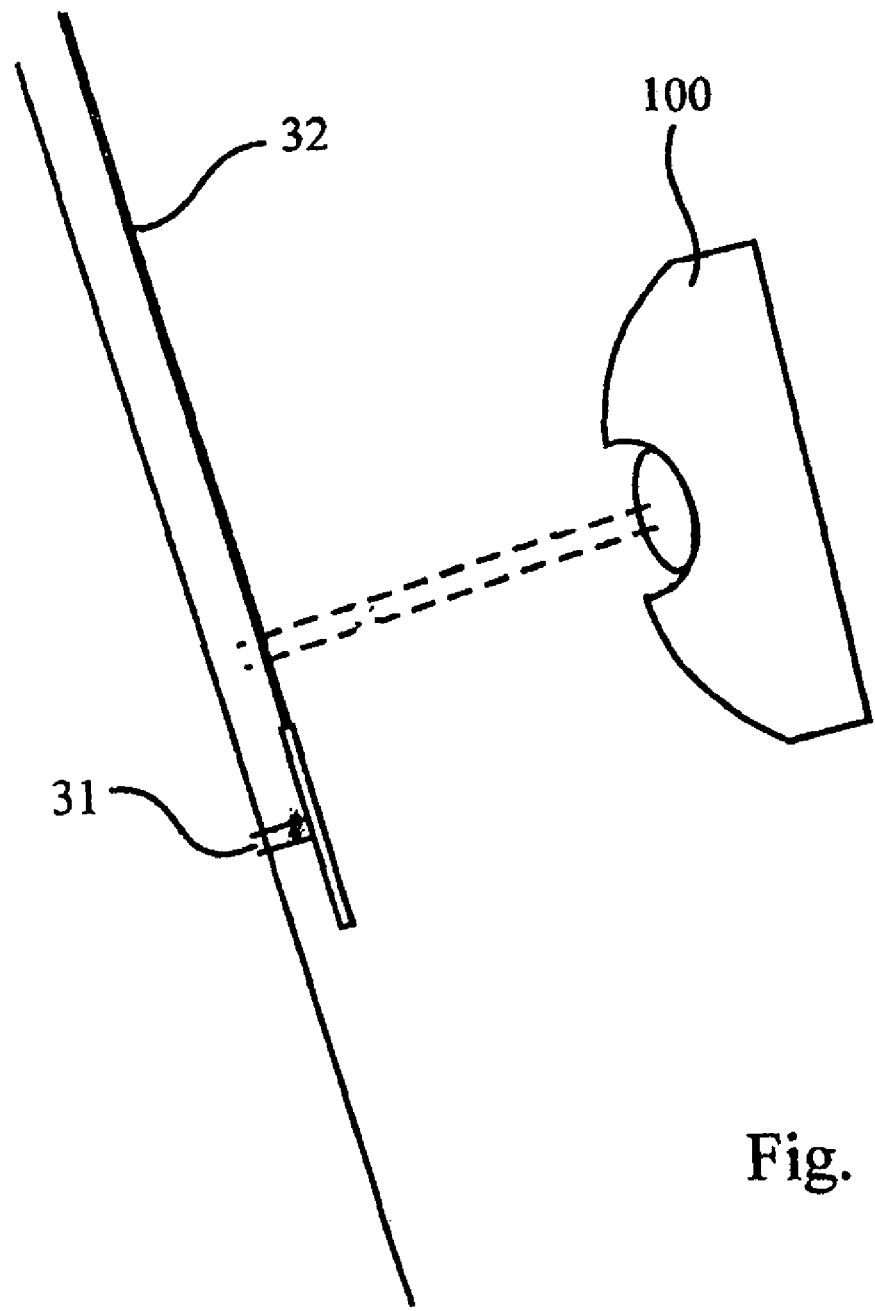

FIG. 5 details the operation of a device with a variable sampling rate;

FIG. 6 is a flow chart showing the method of monitoring an analog gauge using the analog gauge monitoring device of the present invention;

FIG. 7 details a states diagram of a meter monitoring method;

FIG. 8 details one embodiment of the device's front panel;

FIG. 9 illustrates a dynamic allocation of image sensor's resources for a bi-dimensional sensor;

FIG. 10 illustrates a serial reading of illumination intensities of the sectors in the image sensor;

FIG. 11 details one embodiment of sectored radial sensors, designed for reading illumination intensities in each sector;

FIG. 12 details a block diagram of a device having an energy saving structure;

FIG. 13 details another structure of the sectored sensors, adapted to span the actual speedometer's scale;

FIG. 14 details yet another structure of sectored sensors, with means for a differential readout of illumination intensities;

FIG. 15 details yet another structure of sectored sensors, having uniform radial sensitivity;

FIG. 16 details yet another structure of sectored sensors, having uniform radial sensitivity and differential readout of illumination intensities;

FIG. 17 details yet another structure of sectored sensors, having tapered radial sensitivity;

FIG. 18 details yet another structure of sectored sensors, having uniform radial sensitivity;

FIG. 19 details means for positioning and/or alignment of the device, and

Figure 20:
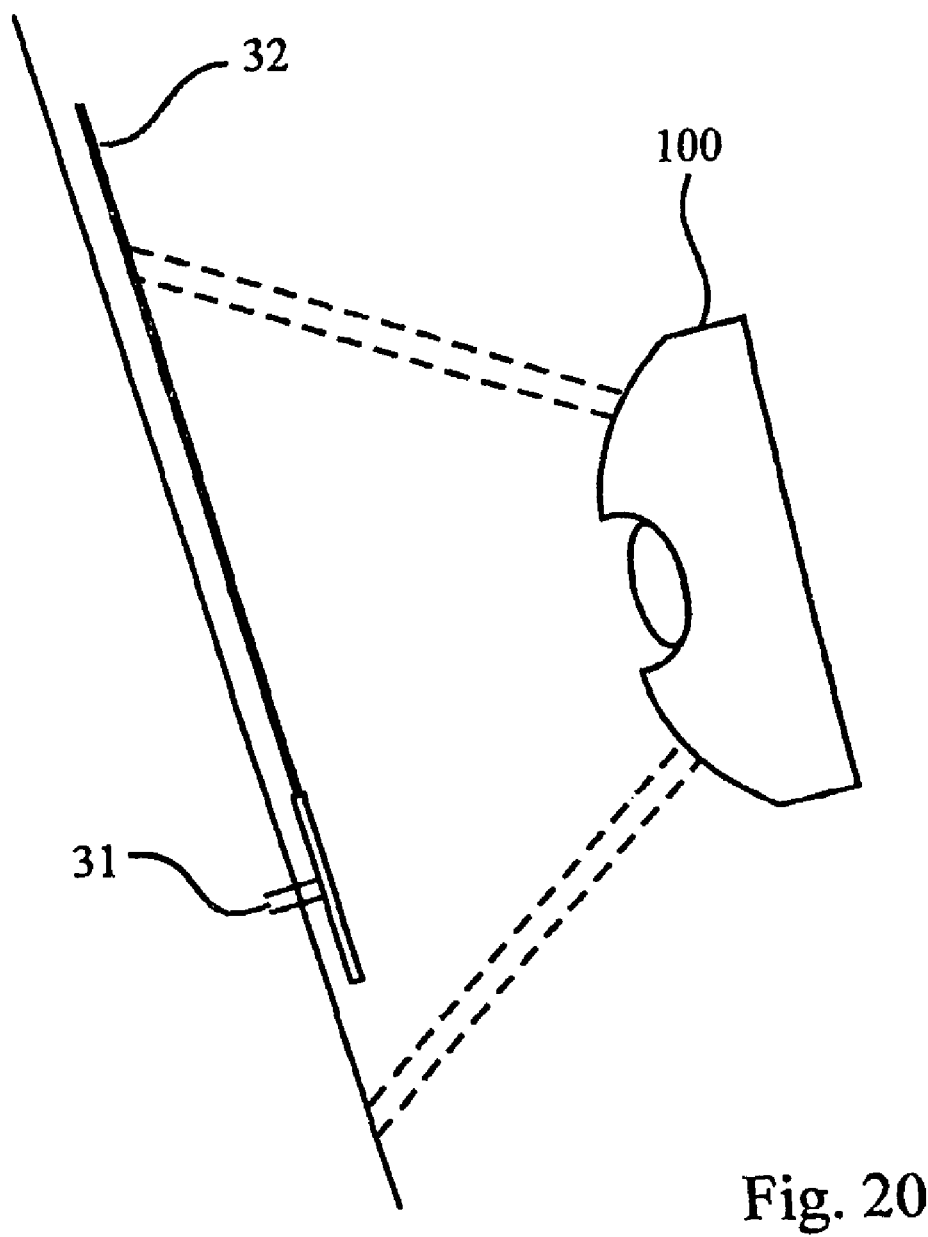

FIG. 20 details another embodiment of means for positioning and/or alignment of the device.

DESCRIPTION OF THE PREFERRED EMBODIMENTS

A preferred embodiment of the present invention will now be described by way of example and with reference to the accompanying drawings. Although the invention is detailed with reference to a vehicle's speedometer, it will be appreciated that it is applicable to various other analog meters used in transportation, industry, etc.

According to the present invention, there is provided a device and method for monitoring analog gauges. Although specific examples may refer to the speedometer of a vehicle, the invention may be equally applied to other types of analog gauges or meters, such as the rev counter of a vehicle, the fuel meter, etc. Furthermore, the device may be used for monitoring other analog gauges or clock meters, in factories, hospitals, power plants, and the like.

The device includes an electro-optical image sensor, i.e. a pixilated array of optical sensors for generating electrical signals indicative of the visual image of the pointer of the analog gauge, and means for taking various actions responsive to the position of the pointer, indicative of the magnitude of the monitored parameter.

The electrical signals from the pixilated array provides a digital signal that corresponds to the analog output of the analog gauge, i.e. the position of the pointer thereof. The analog gauge can thus be electronically monitored continuously, in real time.

Various actions may be taken in response to the electrical signals, triggered by the pointer exceeding a predefined limit resulting in the signal from select pixels of the pixilated array falling out of range, that is having values above or below acceptable thresholds. The pointers of analog gauges are designed to visually contrast to their backgrounds, so the signals received by such an electro-optical image sensor naturally have high contrast and are easy to process. Several minimum/maximum thresholds may be defined for selected pixels to trigger alerts as required.

Use of solid state image sensor means in digital monitoring devices for analog gauges is believed to be new. The flexibility of the data obtainable and the possibility to process the data and/or to store it easily, to calibrate locally or remotely, provides a degree of flexibility hitherto unobtainable.

The digital monitoring device of the present invention is typically a passive device that reads the speedometer or other analog gauge without any transmissions. The digital monitoring device consumes little energy and may be powered by a small battery. In preferred embodiments, the digital monitoring devices uses smart power and resources management, further reducing the power consumption. The power consumption may be even further reduced by taking readings at a slow sampling rate.

The device is adaptive and the various embodiments may use smart algorithms, allowing reliable reading of the speedometer for various scenarios, such as at day or night, despite changing ambient light conditions.

Calibrating and setting digital monitoring devices of the present invention is easy. When used for tracking a speedometer of a vehicle, the various embodiments may monitor one or more speed limits with high accuracy. Such speed limits and method of operation of the device may be easily modified, without physically moving the device.

The digital monitoring device can be retrofitted to practically any vehicle, and does not require changes to the vehicle. The digital monitoring device is small and lightweight and is a low cost device. It is typically easy to install, and may be simply retrofitted to speedometers and other analog gauges and has low operation costs.

Preferred embodiments include data logging in a flash memory or other means, for subsequent processing.

Thus, the digital monitoring device offers a unique combination of practical solutions for various problems related to monitoring speedometers and other analog gauges as well.

Figure 1:
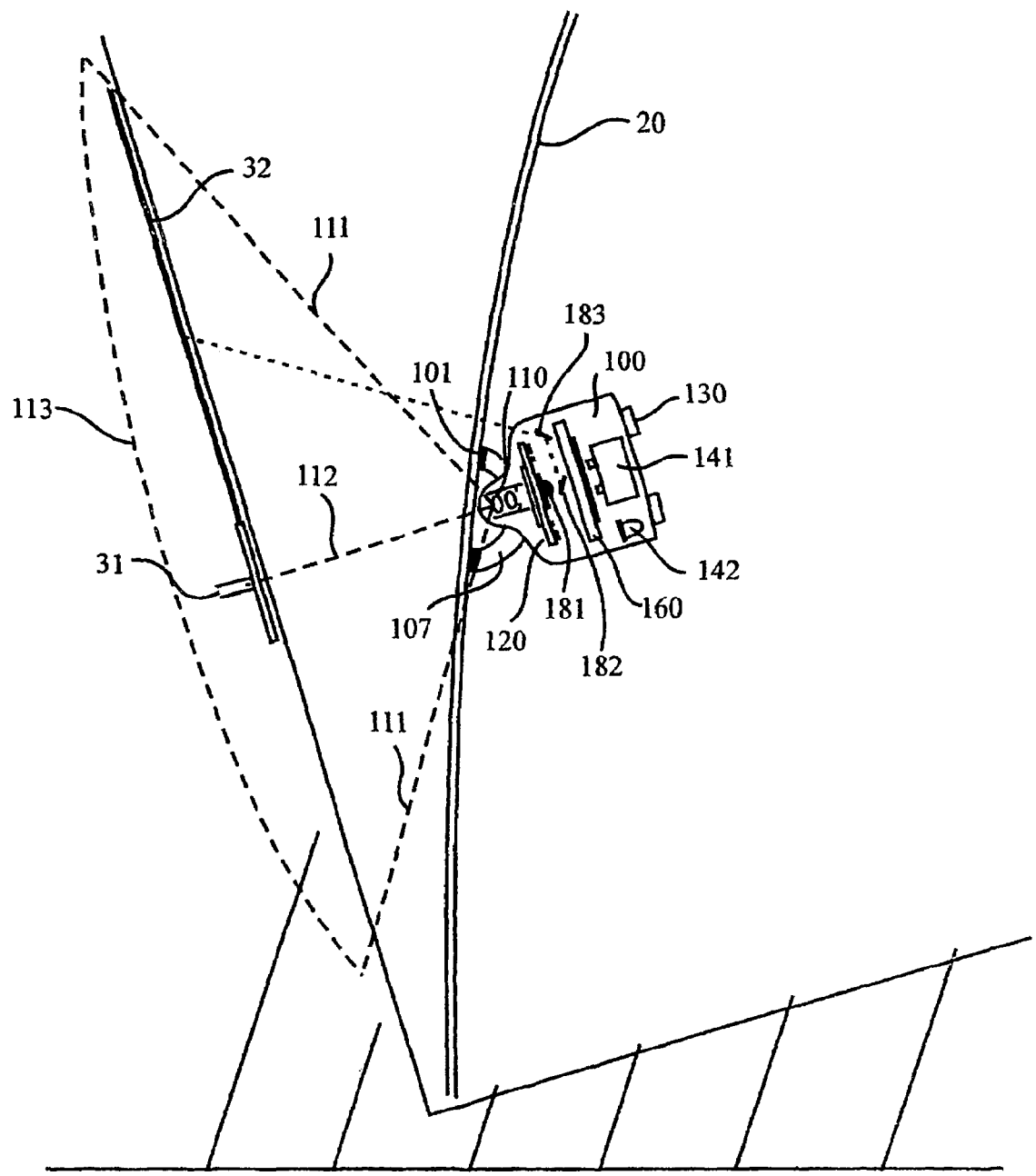

With reference now to FIG. 1, a side view of a digital monitoring device in accordance with one embodiment of the invention is shown, mounted in front of an analog gauge, specifically the speedometer of a vehicle. The vehicle's speedometer includes a moving needle, henceforthe pointer 32, which indicates the current speed on a scale behind it. The pointer rotates around an axle pin 31.

The speedometer is usually provided behind a transparent dashboard cover 20. Such a cover may not be planar; rather, it might be somewhat curved. Typically such covers are angled downwards to prevent accumulation of dust thereupon and to prevent reflection. Thus the cover of the dashboard is often not parallel to the plane in which the pointer of the speedometer rotates. A digital monitoring device 100 for monitoring the pointer of the speedometer is connected to a base 107 by a support means.

The digital monitoring device 100 includes an attachment means, such as an adhesive tape or a vacuum sucker, for locating the digital monitoring device 100 at the center of the analog gauge. Thus, the digital monitoring device 100 is attached by means 101 or other means to the cover of the dashboard.

The digital monitoring device 100 needs to be physically connected to the dashboard just once. There is no need to relocate the digital monitoring device 100 on the dashboard in order to re-configure or set it up.

The digital monitoring device 100 is preferably installed above the axis 31 of the pointer 32, along a line 112 which is normal to the plane of rotation of the pointer 32, and above the axis of rotation thereof. Optional means to correctly install the digital monitoring device 100 are described hereinbelow.

After the digital monitoring device 100 is installed, digital monitoring device 100 may be physically aligned in order to focus on the relevant area of the analog gauge. The alignment may be done by inclining or tilting the digital monitoring device 100 upwards/downwards, in a vertical plane.

The digital monitoring device 100 can be further inclined after its attachment, for setting its orientation to allow the bi-dimensional matrix of electro-optical sensors, henceforth pixilated array, to effectively monitor the position of the pointer 32 of the analog gauge. This alignment is done by the user, wherein the digital gauge monitoring device 100 may optionally present audio/visual alignment information as described hereinbelow, with reference to FIGS. 8, 19 and 20. Thus the digital gauge monitoring device 100 may include display means for guiding the user regarding adjustments in its orientation.

The display means may be used for guiding the user regarding adjustments in the orientation of the digital monitoring device 100 in a vertical plane.

Audio and/or visual indicator means may be used for guiding the user in proper alignment of the digital monitoring device 100.

The digital monitoring device 100 may include a lens assembly 110, with one or more lenses, located on the side of the device which points towards the analog gauge (speedometer). The lens system directs light from the analog gauge onto the pixilated array of the digital monitoring device. The pixilated array 120 includes a two-dimensional array of solid state image sensors, to acquire an image of the speedometer and the pointer 31 using the lens assembly. Thus, the lens assembly applies and projects the received image onto the image sensor means.

Another needle position indicator is detailed below, using an alternative type of radial sensor.

One or more keys 130 allow the driver to set up the device.

A first Light Emitting Diode (LED) 142 will notify the driver about operation and status of the device. A speed-related alarm may be presented by a LED and/or by an LCD and/or by a buzzer 141 or other electronic means.

Several alarm states and modes of operation may be defined and re-defined by the driver. A second LED 181 may be used to project a light spot on the meter's scale, through mirrors 182 and 183, for setting an alarm threshold (this is the LED and optical assay 146 in FIG. 2). The light spot 108 is further detailed in FIG. 3. A battery 160 is used to supply power to the digital monitoring device 100 of the analog gauge. In this novel implementation, a relatively small battery may last for a long time, for example one to three years or more, using the various power saving means herein disclosed.

An image of part of the dashboard area, which includes relevant parts of the speedometer, and is bound by dashed lines 111, is defined by the lens assembly 110 and is projected onto the electro-optic pixels area of the image sensor means 120. Lines 111 define the extent of the field of view, that is the projection 113 of the sensing area.

Figure 2:
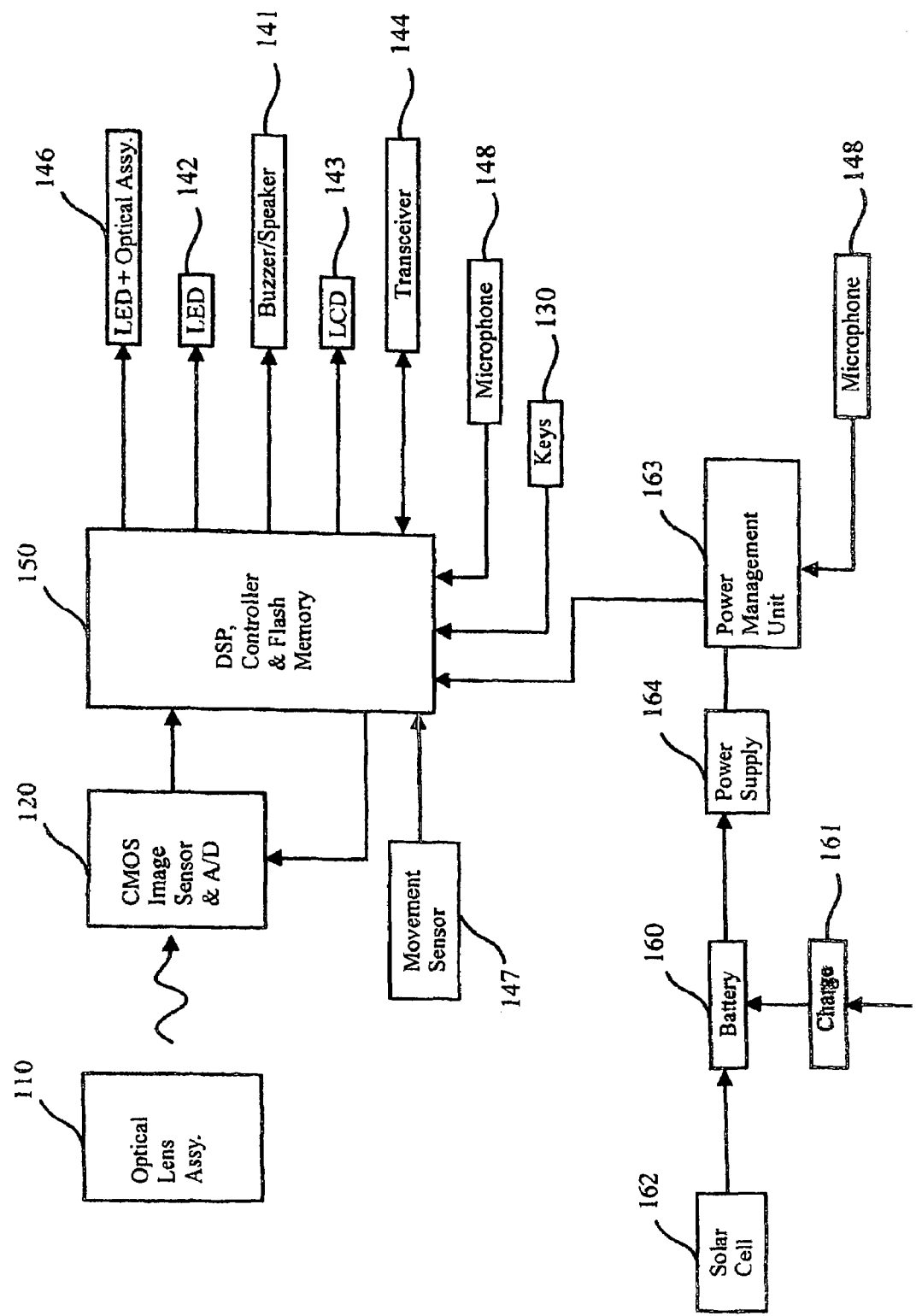

FIG. 2 illustrates a block diagram of the monitoring analog gauge monitoring device 100. An image of the analog meter/speedometer and the needle is projected by the optical lens assembly 110 onto the CMOS image sensor and ADC 120. The sensor's output may be applied to the analog-to-digital converter (ADC), and subsequently undergoes an image recognition process in a Digital Signal Processor (DSP) 150. The CMOS image sensor is one embodiment of a solid state image sensor assembly.

The image sensor 120 includes a pixilated array, such as a bi-dimensional array of pixels. A rectangular array or matrix of pixels (Cartesian) may be used, or a polar pixel array may be used.

With reference to FIGS. 11, 13 to 18, in another embodiment, the image sensor includes a bi-dimensional array wherein the pixels are located at a fixed angular pitch therebetween in a polar plane. The image sensor may include a CMOS device. The sensor means may include a lens system 110. A microphone 148 may activate the device when the vehicle is in use.

The ADC is preferably integrated within the image sensor assembly. Other optional optical and electronic means may be included in block 120 as well, such as color filters, amplifiers, etc.

The CMOS image sensor and the analog-to-digital converter are preferably controlled by the DSP. This may include changing the parameters or mode of operation of means in block 120, including for example:

1. Setting the amplification of the received signal in order to match the received signal's amplitude to the range of the analog-to-digital converter, such as increasing amplification at night.

Optional control of the amplification of various areas of the image is also possible, such as applying a variable, adaptive gain responsive to local brightness of the image.

Other means may include exposure time control. The pixels exposure time provide an effective electronic means to control the device's sensitivity. A combination of the above means may be used.

2. Controlling the sampling rate, thus using the image sensors and ADC only when it is required to make a new sample of the image, to save current.

3. Reading only part of the image area as required, thus saving power supply by ignoring irrelevant parts of the image. This may be implemented by only reading the relevant pixels. In case of a serial readout, some time periods may be ignored, thus reading and allocating hardware and power resources only for the relevant parts of the image.

Digital data is transferred from the ADC to the DSP in block 150, for image recognition in the DSP.

Block 150 may also include a controller and a flash memory. The controller may control other devices such as means in block 120 and other hardware to minimize power consumption.

The DSP needs not operate continuously—the controller may turn the DSP on (or change its mode of operation), as required, for example when the user presses a key or when it has to acquire an image. The controller may include one or more timers which can be set by the DSP, to allow the DSP to define when the next image sample should be taken. Alternatively, an internal timer in the DSP may be used for this purpose. The image processing means may include a DSP.

The image processing means may include threshold value storage means and decision means for activating an alarm responsive to the needle passing a threshold. They may further include storage means for storing a plurality of threshold values and decision means for activating an alarm responsive to the needle passing a threshold.

Various input means may be used for setting the limit(s) of sector(s) thresholds: minimum, maximum, window threshold or a plurality thereof. The Input means may include ON/OFF controls.

Thresholds setting may be performed by various means, including for example light source means (i.e. a LED) for projecting a light spot on the meter's scale for indicating the needle position/angle to be set as a threshold value. A rotatable LED may be used for illuminating the analog meter scale. This LED may be used for calibrating or setting the sector limits.

In one embodiment, the device uses three light sources (LEDs): one for setting thresholds, a second for positioning the digital monitoring device 100, and a third for the alarm or other display functions.

The digital monitoring device 100 may include input means for updating the limits of the sector according to an allowed velocity range, using a communication channel.

A flash memory may hold samples of the last needle angle, the last image and/or additional data.

Other data calculated may include the velocity value. This is useful for various tasks, such as: (a) comparing the current angle of the needle to the last angle in order to calculate the acceleration of the vehicle or other derived variables. Such values may be absolute where calibration is possible and actually performed, or relative/qualitative where no such calibration is performed. The calibration process links the needle angle/position as measured by the digital monitoring device 100, with the actual value displayed to the human operator on the analog meter, (b) facilitating pattern recognition at accelerated rates, using information from previous samples, (c) storing the last sample in the flash memory and identifying the areas of the image which are too bright or too dark, for adaptive adjustment and control of the amplification of received signals, so the signal to the ADC is optimal and adapted to its dynamic range. The pixels exposure time may also be used for such adjustments. This could also be useful such as when entering a tunnel, or when light conditions change in general, such as automatically detecting a reduction in the light level as night falls. Various data such as initial parameters, subsequent additional data, results of calculations, etc. may be kept in the flash memory, which does not require power to be supplied when not in use. Thus, even if the DSP is disconnected from power supply, vital data is preserved.

5. Storing vehicle driving data, for example a speed logbook for subsequent examination/review. The speed history may be transmitted to another device, for examination by the driver's parents, for example.

The DSP is optional. A simpler embodiment is detailed elsewhere in the present disclosure, for example with reference to FIGS. 10 to 18.

Input means, for example one or more keys 130, may be used to allow the driver to set up the device and to operate it, including for example: (i) Setting one or more time limits which the device will monitor and notify the user accordingly, (ii) Defining the time limits relatively to current speed or to fixed initial definitions and setting the kind of alarm to be activated as each speed limit is exceeded, (iii) Verifying the analog gauge monitoring device 100 is working properly and testing it, and (iv) Turning the analog gauge monitoring device 100 ON and OFF.

Output means may be included to notify the user about the status of the analog gauge monitoring device 100 and the speedometer. These means may include a Liquid Crystal Display LCD 143 to notify the driver about operation and to monitor the status of the analog gauge monitoring device 100. Alternately, the display may use LEDs or other display means. A transceiver 144 allows controlling and monitoring the device by external means. A Bluetooth chip may be used, for example, to easily control the analog gauge monitoring device 100. For example, the digital monitoring device 100 for monitoring an analog gauge may be initially set by a cellular phone, a palm or another mobile device which is Bluetooth compatible. In this case, the digital monitoring device 100 for monitoring an analog gauge could have fewer input means, such as just an on/off button. Another example is using infrared (IR) means to control the analog gauge monitoring device 100.

The transceiver may also facilitate testing of the digital monitoring device 100 for monitoring an analog gauge and its installation, for example for initial mechanical adjustments and subsequent tests. The external device may be a laptop computer, for example.

On reaching or passing a certain speed, an alert may be indicated with a LED, an LCD and/or a buzzer 141, or other suitable means. Various primary or secondary (rechargeable) battery means 160 may be used. An optional solar cell 162 may help or recharge the battery. The power supplied to the various components of the digital monitoring device 100 for monitoring an analog gauge is delivered through a power supply unit 164.

The power supply controls the electric voltages and/or currents to the various components and is managed by a power management unit 163. Both of these units are optional. In another embodiment, the power supply may also be connected directly to each component, in accordance with accepted engineering practice.

The parameters of operation of the power management unit are controlled by the DSP. The DSP may decide when and how each component will be used. The DSP itself may be turned off and disconnected from the power supply for a period of time, for example between samples. This time interval may be set by the DSP itself as part of the power management control program. It will, however, be appreciated that the DSP is optional. By way of example, a simpler, alternative structure, having lower cost and consuming less power, is detailed, with reference to FIGS. 10 to 18.

The instructions to turn the DSP off may also be sent from the DSP to the power management unit, after all relevant data is kept in the flash memory. The flash memory can then be turned off as well, as the data is retained therein, even when it is disconnected from the power supply.

The power management unit may also verify that the battery is functioning correctly and contains charge. It may notify the DSP which will notify the user, should the battery need recharging or replacing. Where rechargeable, a charger 161 may be provided for recharging the battery.

An optional movement sensor 147 may be included within the analog gauge monitoring device 100, to save energy: The digital monitoring device 100 for monitoring an analog gauge will be automatically activated when the vehicle is moving, and will be turned off when it has stopped for a considerable time. The sensor 147 may be implemented as a physical sensor to monitor acceleration changes, vibrations or any other variables indicative of movement. Off-the-shelf movement sensors may be used for the analog gauge monitoring device 100 such a movement sensor may be a passive device that does not require power.

To save power, when the vehicle is parked and/or not moving or according to any suitable indication, such as when the speedometer's needle is pointing to zero for some time, the digital monitoring device 100 for monitoring an analog gauge can be automatically switched off or into an idle mode.

During the time the digital monitoring device 100 for monitoring an analog gauge is idle, a simple circuit or any other hardware and/or software means may monitor the movement sensor 147, instead of monitoring the speedometer's needle, which requires more resources and consumes more power.

When movement sensor 147 or other means indicates that the vehicle is beginning to move, the digital monitoring device 100 for monitoring an analog gauge is turned on or changes its mode of operation from idle to active mode.

The digital monitoring device 100 for monitoring an analog gauge may be set on and off by the user as well, thus the movement sensor is optional. It may optionally save the need to manually turn the digital monitoring device 100 for monitoring an analog gauge on and off.

According to another embodiment, the movement sensor can be used in order to save resources, such as in case of a traffic jam when vehicles are not moving or moving slowly, or in case the user forgets to turn off the analog gauge monitoring device 100.

Optional indication regarding the mode of operation may be implemented in the analog gauge monitoring device 100, which may include audio and/or visual notifications, such as issuing a beep or turning on a LED indicating the device is idle. Optionally, the user may override or disable this mechanism.

Optional light beam generation means 146 can be implemented, for example, by one or more LEDs or a laser device. The light beam generation means are capable of creating one or more lighted spots 108 on the speedometer's scale. This can be used for two major purposes:

(i) When initially installing the analog gauge monitoring device 100, light marks may help place the digital monitoring device 100 for monitoring an analog gauge at/near the best location on the dashboard, see FIGS. 19, 20. It is important that the digital monitoring device 100 for monitoring an analog gauge be located above the axis of the analog meter, for reliable monitoring. A light spot 108 (FIG. 3) may help set up a user-defined threshold for the analog gauge monitoring device 100. Sometimes, it is not advisable to set a threshold at the current value indicated, for example when such value pertains to a dangerous temperature level or a hazardous RPM of the engine. See for example LED 181 and mirrors 182, 183 in FIG. 1.

(ii) When initially installing the analog gauge monitoring device 100, preferably above the axis of the needle as described regarding for example FIGS. 1, 19 and 20, light marks may help place the digital monitoring device 100 for monitoring an analog gauge at the best location on the dashboard.

For example, the light beam generation means 146 may point straight ahead, allowing the user to install the digital monitoring device 100 for monitoring an analog gauge by pointing the light spot towards the axis of the speedometer's needle.

Alternatively, the light beam may project an illuminated area, having another shape, such as an elongated spot, in order to help position the digital monitoring device 100 at a correct angle with respect to the analog gauge.

There may be more than one spot, to facilitate viewing the light spots and installing of the digital monitoring device 100. Light spots may also help or replace the signs on the display responsible for vertical angle alignment of the digital gauge monitoring device 100, after the digital monitoring device 100 for monitoring an analog gauge is installed. The alignment may be done by inclining the digital monitoring device 100 for monitoring an analog gauge upwards/downwards, in a vertical plane. This alignment is done by the user, wherein the digital monitoring device 100 may display alignment information, see for example FIG. 8.

The light spots may replace an alignment monitoring mechanism within the digital monitoring device 100 and thus save displaying data regarding this alignment, as described with reference to FIGS. 19, 20, by letting the user align the device simply by pointing the one or more light spots at the required location on the speedometer. In this embodiment, image recognition for the alignment may not be required, since the alignment is monitored directly by the user rather than by the digital monitoring device 100. Light spots may help or replace the part of the display of the digital monitoring device 100 which is responsible for presenting speed thresholds which were defined by the user.

Thresholds may be set and recognized directly, by creating one or more light beams on the speedometer, using the light beam generation means 146. The user can move the threshold by using any input means of the digital monitoring device 100, and verify that the thresholds are set properly. For both of the abovementioned uses, display resources and hardware resources may be dispensed with. For both of the abovementioned uses, the required light beams and/or spots are only generated when required by the user, such as in order to verify the thresholds, to align the analog gauge monitoring device 100, to change a threshold, etc.

The digital monitoring device 100 may include means for reaching a decision regarding the activation of an alarm. The alarm may be audio and/or audio/visual and/or speech. The alarm may use an LED, an LCD or a buzzer, for example.

The system can be used in a passive cruise control (PCC) system for maintaining a constant vehicle speed over prolonged time periods.

The analog gauge monitoring device 100 includes means for reaching a decision regarding the activation of a transmitter/receiver for data transfer, and/or means for reaching a decision regarding the storage of data in storage means.

The alarm may be activated for a fixed predefined time period. In another embodiment or mode of operation, the alarm may be activated for as long as the needle (pointer) is within an alarm-generating segment. In yet another embodiment, the alarm is activated for as long as the needle is above a velocity threshold.

Various energy saving means may be used. For example, means for changing the scan rate may be used for saving energy, by using a slower rate when the needle is farther away from a threshold value or an alarm activation sector. These means may include a variable rate of image scan and signal processing. The digital monitoring device 100 may include means for entering a low power consumption mode of the digital monitoring device 100 when the needle of the analog gauge cannot be monitored. For example, it may enter this mode at night, when it is dark. The energy saving mode may be activated at night and switched off the following morning. The low consumption mode may use a very slow scan mode. The analog gauge monitoring device 100 may include a vibration/movement sensor for helping achieve a lower energy consumption operation.

This structure and method saves in power consumption, since the light beam generation means are only used for small periods of time and all of these operations may be done just once, for a later rapid use.

Other input means may include means for keeping track of time and date. Such information may be advantageously used in the digital monitoring device 100. The digital monitoring device 100 may also include temperature measuring means. The digital monitoring device 100 may also include means for stopping the operation of the device when the temperature exceeds a preset value.

The digital monitoring device 100 may also include means for stopping the operation of the digital monitoring device 100 when the temperature is below a preset value.

The digital monitoring device 100 may also include a unique identification number. The identification number may be related to the vehicle's registration number. The number may be encrypted.

The digital monitoring device 100 may also include means for detecting removal of the digital monitoring device 100 from the location where it has been installed.

At the start of a journey, when the velocity exceeds a preset value, the monitoring device 100 may perform a self test including a battery test.

Threshold Setting Method and Means

As detailed throughout the present disclosure, threshold values can be set using any of the following means or a combination thereof:

1. Pushbuttons on the digital monitoring device 100 itself. The user may change a displayed value using UP/DOWN pushbuttons. The desired value is then entered into the memory of the digital monitoring device 100, to act as a threshold there.
2. Entering the present needle's position or location as a threshold. The digital monitoring device 100 may have a button which, when pressed, enters the present needle location as a threshold.
3. Pointing at the meter's scale using a light beam, to project a spotlight at the needle location/angle where the threshold should be set.
4. Using a receiver in the digital monitoring device 100, connected to external communication means using, for example RF, infrared or other means, for entering a threshold.

Figure 3:
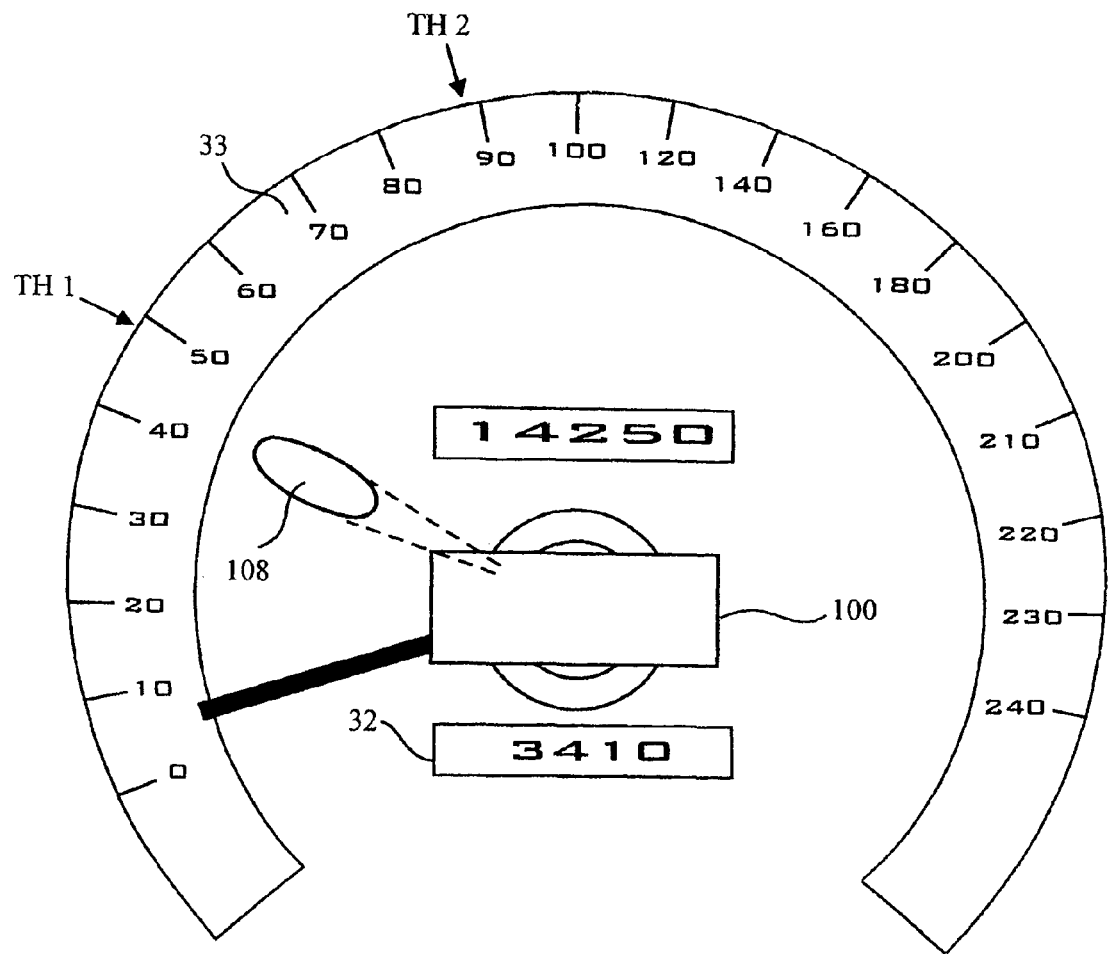

FIG. 3 illustrates the digital monitoring device 100, which is placed/attached in front of the speedometer, above the axis of the speedometer's needle 32. This figure details which area of the speedometer may be invisible to the driver.

As illustrated, the digital monitoring device 100 does not affect the driver's capability to read the speedometer, since it is clearly separated from the speedometer's scale 33.

One or more threshold levels may be defined. If the needle passes any of these thresholds, an alarm will be initiated by the digital monitoring device 100, as defined and according to the method of operation. Referring to FIG. 3, various alarms may be defined for each of two thresholds defined by the user: one at speed 50 Km/h: "TH1", and another for speed of 100 Km/h: "TH2". It will be appreciated that these thresholds are only marked on the figure for convenience, they need not be actually marked on the speedometer or the vehicle.

Light beam generation means may produce one or more lighted spots 108 on the speedometer's scale. In one embodiment, separate light beam means are used for each one of the following tasks:

1. When initially installing the device, preferably above the axis of the needle as described regarding FIG. 1, light marks may help place and/or align the device at the optimum location on the dashboard. This procedure is also described with regards to FIGS. 19 and 20.
2. Light spots may help or replace the part of the device's display which is responsible for presenting speed thresholds which were defined by the user. Thresholds may be set and recognized directly by creating one or more light beams 108 on the speedometer, by the light beam generation means. The user can move the threshold by using any input means of the device (for example by mechanically rotating the dial with LED 181 and mirrors 182 and 183, see FIG. 1), and verify that the thresholds are set properly.

Figure 4:
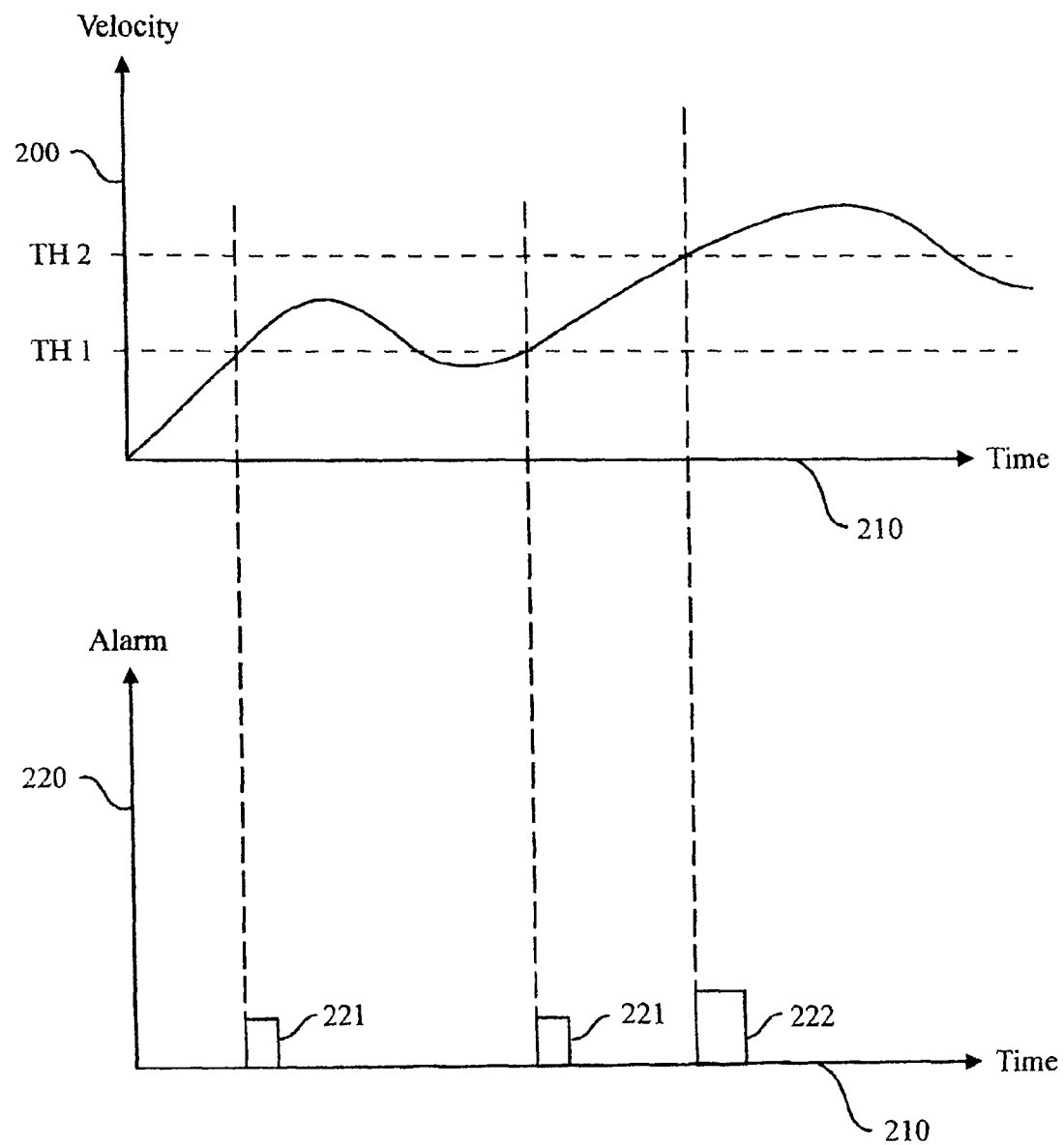

FIG. 4 illustrates possible alarm scheduling and triggering events. The velocity and alarm occurrences are described in FIG. 4 with respect to time 210. When the velocity 200 passes a certain speed limit or threshold, as defined by the user, such as TH1 or TH2, an alarm is activated.

An alarm 220 can be issued when the vehicle is likely to pass a speed limit, and/or when the vehicle is close to a speed limit. The alarm can be activated as long as the vehicle is above the speed limit or for a fixed time period or until the user disables it. For each alarm type, a different form of output means may be used, for example a two seconds beep and a flickering of a LED until the user presses a key, may be one type of alarm 221, when the vehicle's velocity passes the value TH1.

A voice announcement and/or a constantly illuminated LED, activated for a fixed time period, are another example of alarm 222, when the vehicle's velocity passes TH2.

FIG. 5 illustrates how the device's sampling rate may be changed to save energy. The velocity 200 and sampling rate 230 are detailed in FIG. 5 with respect to time 210. When the velocity 200 passes a certain speed limit or threshold, as defined by the user, such as TH, an alarm is issued.

The digital monitoring device 100 is designed for low power consumption. For example, if the velocity is far from any threshold and the device finds that, based on current speed and calculated acceleration, the vehicle is not close to any threshold, then the sampling rate may be lower. The resources of the device, such as the DSP and imaging means, may be idle for longer time periods, such as for a period of T1 seconds. This variable may be fixed or redefined and calculated by the DSP or other means in the digital monitoring device 100.

In case the vehicle exceeds a predefined speed, i.e. V1, or as the velocity is relatively close to the threshold TH, then the sampling rate is higher, and the period between the samples T2 is smaller than T1.

The sampling rate may also be affected by the acceleration, thus in case the velocity is climbing fast and even if the current velocity is low, the sampling rate may be increased, because the velocity of the vehicle is expected to approach the threshold limit TH within a short time.

Thus, the DSP may decide the optimal sampling rate based on current velocity and calculated acceleration. The digital monitoring device 100 may switch between several fixed sampling rates or may use a variable rate.

The digital monitoring device 100 may save electrical power by smart control of the image sampling and processing. By lowering the rate of image acquisition and DSP processing where practical, the duty cycle is reduced, thus the average current consumption is reduced accordingly, to prolong the battery life.

For example, assuming the following situation: Vehicle velocity: 36 Km/h which is 10 m/s (meters per second). Threshold: 90 Km/h which is 25 m/s Current acceleration: 1 ms$^{-2}$. If the maximum possible acceleration of the vehicle is 4 ms$^{-2}$, then after 3.5 seconds the maximum possible speed would be: 10+1+4#3.5=25 m/s, thus the next sample could be taken, for example, after 3.2 seconds. Actually a faster rate is recommended, as the acceleration may change. The above calculation assumes that the reading of the digital monitoring device 100 is calibrated, so that the digital monitoring device 100 measures the actual value indicated on the speedometer.

Such a simple calculation may save power. Optionally the digital monitoring device 100 may detect that the driver is falling asleep. If the acceleration is too high, the digital monitoring device 100 may activate an alarm regardless of the velocity passing a threshold. This helps prevent the danger of unintentional excessive speed, in case the driver relaxes and their foot is inadvertently released to press the gas pedal.

FIG. 6 illustrates a flow chart of a possible method of operation. A method for monitoring the speedometer may comprise:

1. Adjusting sensitivity 300—Amplification of the signal or parts of the signal, which should be read by the image sensor is set. This is optional and may take into account previous readings of the image sensor. Such adjustment may be performed by controlling the sensor's exposure time.

2. Reading image sensor 310—the image of the speedometer is read and converted to electronic signals or data readable by digital electronic means.

3. Pattern recognition 320—Image recognition may focus on the indicator's angle, or may also include the speedometer scale for absolute velocity readings. In the latter case, the scale needs to be read just once, then it is kept in memory for subsequent readings and processing. Other means for calibrating the device may be used. The location or orientation of the speedometer's needle is read on a regular basis. Relevant data pertaining to the overall image may be updated less frequently, such as checking the illumination level in order to calculate required sensitivity 300 for subsequent samples.

4. Calculating the Velocity and Acceleration 330—Based on the data which includes the location of the speedometer's needle and the initial data which specifies the location of the numbers on the scale, the velocity V can be calculated. Based on velocity changes over time, the acceleration which is the derivative of the velocity over time (dV/dt), can be calculated.

5. Checking the velocity against a threshold 340—If the velocity passes a predefined threshold TH1, as set by the user, then an alarm 350, which is referred to as alarm 1, is issued according to what was defined as TH1. The velocity may pass a certain threshold, or, as previously detailed, conditions may be checked regarding the velocity and acceleration as well.

Thus, in a preferred method of operation, the device may initiate an alarm if there is a danger that the velocity will soon pass the threshold based on current acceleration, even if the velocity is currently smaller than the threshold.

6. Obviously, if an alarm or alert was already given and the velocity is decreasing there is no need to raise an alarm again, thus an alarm is not issued when the vehicle is slowing down, even though the velocity passes the predefined threshold. A hysteresis may be applied in activating the alarm. The above means may be advantageously used to prevent frequent, annoying unwarranted alarms, especially when the meter is in the vicinity of a threshold.

7. Checking whether the velocity passed additional threshold levels 342—In a similar manner, more threshold levels may be defined, such as TH2. This threshold may be associated with another mode of alarm 352, herein referred to as alarm 2. An alarm may be associated with a minimum/maximum value or a window or area on the analog meter. It is reasonable to only define two threshold values, i.e. one for urban areas and another for highways, however there may be any number of thresholds for various implementations of this invention, as needed.

8. Setting sampling rate 360—Based on the status of the velocity and acceleration, the mode of operation and the likelihood that a threshold will be reached, a sampling rate is determined. Thus, until the time for the next sample, less resources may be used, such as disconnecting flash memory and setting DSP for idle mode, while a controller can handle the device, such as checking for user inputs, to save electric power.

9. Sleep mode/Delay 370—Various calculations may be done using a DSP or in hardware. After defining the timing of the next sample in the previous stage, and a timer in the controller was set pending the next sample, the device may be in a sleep/delay mode wherein a DSP and other resources are inactive. During these time periods, a minimal power is required, to achieve lower average power consumption.

10. The above steps are repeated, using initial data. It is possible to sample and calculate only relevant information, thereby saving power, resources and processing time.

FIG. 7 illustrates a states diagram for the above method. When the velocity is relatively far from any threshold, the digital monitoring device 100 is in a rough speed calculation and estimation mode 381, thus less resources may be used, for example taking fewer samples, using an image at lower resolution allowing to use less resources. The velocity may be calculated roughly but the exact velocity may not be that important as saving power and resources usage. Thus, power is saved both in processing and in image acquisition.

After making the required calculations, a delay 382 can be set up. During this time, minimum usage of resources is made. This delay can be relatively large as the velocity is not likely to pass any threshold anytime soon.

The length of the delay may be set by the digital monitoring device 100, or may be fixed. It is possible that the velocity calculation at 381 will be more accurate, allowing for better estimation of future velocity and using a larger delay at 382.

When it is estimated that the digital monitoring device 100 is approaching a specific threshold, according to predefined criteria, for example it is estimated at 381 that the velocity would reach TH1 within five samples, then the device would change its mode of operation to 383, in this example. In this mode, a more precise speed calculation is done, to activate an alarm as soon as it is required according to definitions. If the velocity passes TH1, then an alarm 385 is issued, in this case the alarm 1. This is the type of alarm device which was defined for this threshold.

Estimation of future speed and acceleration calculation is done more accurately than in mode 381, allowing to make smarter decisions and optionally better adjusting a delay 384.

After the required calculations are completed and before the next sample, a smaller delay 384 is used, again for saving power. This delay is smaller since the velocity is closer to the threshold and is more likely to pass the threshold, however if the acceleration is small for a period of time, it is optionally possible to also increase this delay in order to save power.

In a similar manner, more thresholds may be defined, such as TH2, where mode 386 for TH2, functions similarly to mode 385 for TH1, but may use various parameters and definitions.

A small delay 387 for TH2, functions similarly to the small delay 384 for TH1, but may use various parameters and definitions.

Triggering of alarm 2, at 388 for TH2, functions similarly to the triggering of alarm 1, at 385 for TH1, but may use various parameters and definitions.

When the velocity is about to cross a certain threshold, more resources are used, hence the digital monitoring device 100 is in high resources usage mode. When the velocity is far above the nearest threshold, a lower resources usage rate is chosen.

FIG. 8 illustrates the digital monitoring device 100 with a front panel which may include keys, LEDs and buttons. A combination of the following may be used:

1. Physical alignment indicators 102—May be implemented by LEDs which will inform the user whether it should be inclined upwards or downwards about its axis. This can include another mode of the device and/or may be verified during its regular operation—that a relevant area of the speedometer is seen and recognized by the device.
2. Locking button 104—After physical alignment is completed, this button locks the device, preventing it from moving with respect to the surface on which it is mounted, thereby locking it at the desired angle.
3. Threshold setting keys 130—Each of the two buttons TH1, TH2 may define the mode of operation of each threshold. For example, each click of one of these buttons will change the threshold value as follows: [off], 50, 60, 70, 80, 90, 100, 110, [relative to current]. The additional "+" and "−" buttons may change the last modified threshold by 1 in relation to the value that was defined with the TH1 or TH2 button, in case it is defined as "relative to current" then the threshold will be defined in relation to current speed. A display (not shown) may indicate the values of each threshold. Both thresholds may also be set by just pressing one button, thus according to normal limits of driving, such as:
   mode1: TH1=50, TH2=90
   mode2: TH1=60, TH2=100
   mode3: TH1=50, TH2=100
4. Other LEDs 103—may indicate an alarm, proper operation of the device, battery status (full/empty), device turned ON, etc.
5. Other buttons or keys may be used, to define the mode of alarm for each threshold, etc.

FIG. 9 illustrates a possible dynamic allocation of image sensor's resources. It is possible to ignore the irrelevant part of the active sensing area 113. Relevant areas 320 may be read at a reduced rate and/or resolution.

In the figure, smaller squares indicate areas in which reading can be made at higher resolution and more frequently. This can be implemented in hardware and/or software.

The abovedetailed device structure with a DSP is optional. A simpler embodiment is detailed below. It may be cheaper to manufacture and may consume less electrical power.

Various image reading embodiments may be used to measure the angle at which the needle is pointing, for example using an angular/polar optical sensor means.

Using this approach, it is possible to eliminate other light spots, interferences and various source of errors. The needle cannot "jump" to a new location but can only change direction relatively slowly. Thus, it is possible to track the needle even with poor image readings, and ignore errors efficiently.

Using this approach may help make faster decisions with minimal use of resources regarding the direction in which the needle is pointing and the status of the speedometer's needle in relation to the predefined thresholds. Thus, on some embodiments, the use of a DSP can be disposed with, and only a simple, low cost controller is required to operate the device.

FIG. 10 illustrates illumination intensities distribution in sectors of the new device image sensor, corresponding to one instant of a speedometer's image. The graph represents the value of pixels voltages 420 out of the detector as a function of time or angle 410, as may occur when reading the pixels serially. A higher value corresponds to a stronger illumination of an angular sector of the speedometer. This is an example of a simple, low cost implementation of the present invention.

The precision of the meter angle readout may be enhanced in software, by using the measured light intensities in several adjacent sectors and using interpolation. Thus, FIG. 10 illustrates a serial reading of illumination intensities of the sectors in the image sensor. Illumination intensities 420 can be an analog voltage reading vs. time or angle 410. The graph represents one sample of the image, where the detector sample values are taken out serially, sequentially from all the sectors of the image detector.

It can be seen that the peak 421, representing the location of the needle can be easily found, however other peaks such as 422 may be present and even have larger amplitude than that of peak 421, representing the real location of the needle.

The digital monitoring device 100 tracks the location of the needle from one sample to another and may calculate its most likely future location, such as by calculating acceleration. Thus, even strong interferences and noises can be ignored since previous locations and the tendency of the needle are known.

The serial data regarding the image may be read serially using shift registers or other type of digital and/or analog memory means, or may be immediately evaluated without memory means. In another embodiment, relevant data may be read in parallel.

FIG. 11 details one embodiment of sectored radial sensors, designed for reading illumination intensities in each sector. Each dark area represents a sensor element light sensitive area, capable of reading the image at that sector. The circular area at the center is located above the axis of the speedometer's needle. In this embodiment, it is easily possible to decide the location of the needle using a small number of identical electro-optical sensor light sensitive areas. Using this radial polar sensor areas formation rather than the more usual rectangular sensor matrix, a more efficient implementation can be achieved because this formation is matched to the shape of the needle at its various possible locations.

FIG. 12 details a block diagram of a device having an energy saving structure.

Unit 152 may be implemented just using a controller without a DSP, thereby further reducing the power consumption. This implementation can be efficiently used for sectored light sensitive areas, such as described in FIGS. 12-14.

Instead of using complex algorithms, the location of the needle may be found more easily using an approach which includes simple comparisons of light intensities at relevant sensor light sensitive areas. The novel radial light sensitive areas implement an optical correlation process to replace the digital correlation previously performed in the controller. The number of light sensitive areas may be reduced and the comparisons implemented directly with analog signals, dispensing altogether with the need for digital resources such as an ADC and a DSP.

Unit 122 can include one or more simple analog comparators which may be cheap, efficient and consuming low power. Unit 152 can include one or more simple controllers which may be cheap and efficient, consuming low power. A small battery 160 may be used to supply all the required power.

FIG. 13 details another structure of the sectored sensors, adapted to span the actual speedometer's scale. Sectored sensor light sensitive areas are similar to those at FIG. 11, however since there is a non-relevant area at the bottom below the location of the axis of the needle, no sensor apertures are required in that area.

Alternatively, other sensor light sensitive areas formations may be used in which sensor apertures above non relevant areas are not included. This saves image sampling resources and power consumption as well. Non relevant areas may include areas which the needle cannot reach and areas which are not practical, such as the area at the speedometer's scale which includes speeds of 200+ km/h, etc.

FIG. 14 details yet another structure of sectored sensors, with means for a differential readout of illumination intensities. Each sectored sensor light sensitive area of FIG. 14, now consists several sensor areas, which are parted at fixed distances from the middle of the formation.

The middle of the light sensitive areas formation is also the location of the needle's axis. The new formation is more complicated than the light sensitive areas formation of FIG. 11, however it enables more possibilities of reading the image: It is possible to read the sensor array of a certain radius. This is useful if there is interference and the location of the needle cannot be calculated as required. By deciding according to a more limited area, a better decision might be made.

If there is an interference or unwanted illumination it can be easier to detect, since typically not all the sensor array at that sector will receive the same amount of illumination.

In general, by using the novel sensor light sensitive areas formation, it is possible to better identify different shapes of illumination, thus it is possible to identify the shape of the illumination of the needle, and other shapes rather than the needle as well, allowing better decision making.

It is possible to ignore specific sensor pixels or specific radii at which the decision is harder to be made regarding the sector that the needle is presently pointing at.

Many different approaches may be implemented in order to decide the direction in which the needle is pointing. The device's hardware may be optimized to best fit the selected approach or method of operation.

FIG. 15 details yet another structure of sectored sensors, having uniform radial sensitivity. Using a fixed width sensor, light sensitive areas might allow a better decision, since the needle itself often has a fixed width, a fixed width sensor light sensitive areas would be better adapted to measure it. The location of the needle can be derived by a calculation which takes into account the illumination distribution among several sensor pixels.

It might be more practical and simple to manufacture or use a fixed width sensor areas rather than other shape of sensor areas. Using a smaller number of sensor pixels may save resources and hardware complexity, while, nevertheless achieving a satisfactory level of performance.

This sensor light sensitive areas formation might better reject interference, since narrower areas with less area would also receive less illumination. This is effective against most types of interference, which have a different shape than that of sensor area, thus a smaller area of the interference would influence the received illumination at the sensor areas.

FIG. 16 details yet another structure of sectored sensors, having uniform radial sensitivity and differential readout of illumination intensities. Each fixed width sensor light sensitive area of FIG. 15, now comprises several sensor elements, which are parted at fixed distances from the middle of the apertures formation.

The middle of the light sensitive areas formation is also the location of the needle's axis. The new formation is more complicated than the light sensitive areas formation of FIG. 15, however it enables more possibilities of reading the image:

It is possible to read the sensor pixels of a certain radius, this is useful if there are interferences and the location of the needle cannot be calculated as required, then by deciding according to a more limited area, a better decision might be made.

If there is an interference or unwanted illumination it can be easily detected, since probably not all the sensor pixels at that sector will receive the same amount of illumination.

In general, using the novel sensor array formation, it is possible to better identify different shapes of illumination, thus it is possible to identify the shape of the illumination of the needle, and other shapes rather than the needle as well, allowing to make a better decision. It is possible to ignore specific sensor pixels or specific radii at which a decision is more difficult to make, regarding the sector the needle points at.

Many different approaches may be implemented in order to decide the direction in which the needle is pointing, the device's hardware may be designed as to best fit the selected approach or method of operation.

FIG. 17 illustrates a possible allocation of sensors, where each sensor is reading illumination intensity at a descending width strip. This sensor light sensitive areas formation gives more weight to the area which is closer to the needle's axis, this might be useful when the reading of illumination intensities is considered more reliable at smaller distances from the axis of the needle. It may also be useful in case the needle is considered as relatively short, or in cases it is not illuminated well enough at its pointing edge. The scale might interfere at bigger distances from the needle's axis. At night or in general, the speedometer often has an illumination, thus the needle might be read better by the device at certain locations at the dashboard and the sensor light sensitive areas would ideally have the best matched shape to receive the strongest illumination from the needle with minimal interferences. In this embodiment it is assumed that the closer area to the needle's axis is illuminated better.

FIG. 18 illustrates a possible allocation of fixed area sensors, where there are several different arrangements of sensors at different distances from the center.

This sensor light sensitive areas formation illustrates a possibility in which there are different shapes of sensor light sensitive areas in several distances from the needle's axis or the center of the formation.

The sensor light sensitive areas would be optionally rectangular in order to ease the implementation or to better match the illumination. The sensor light sensitive areas can have different shapes as well, not necessarily rectangular.

Using this embodiment, it is possible to use narrower and shorter light sensitive areas closer to the axis of the needle, in order to better recognize the needle's elongated shape, while at larger distances from the needle's axis there is more place between the sensor light sensitive areas, thus it is possible to allow wider sensor light sensitive areas which can receive more illumination from the sides as well. Using this combination of different light sensitive areas, the possibilities are endless, for example:

It is possible to compare illumination amplitudes at different radii and only decide based on one group of sensor light sensitive areas at one radius;

It is possible to ignore sensor light sensitive areas with illogical readings and decide based on other sensor pixels at one radius;

It is possible to give sensor light sensitive areas on different radii a different weight in the overall calculation, this can be done by software and/or by hardware means of the device;

It is possible to give sensor light sensitive areas at different sectors a different weight in the overall calculation, this can be done by software and/or by hardware means of the device.

FIG. 19 illustrates possible means for positioning/alignment of the device. As illustrated in FIG. 1, the speedometer is usually placed behind a transparent dashboard cover, which might be somewhat curved. Since the cover of the dashboard is often not parallel to the plane in the speedometer's needle rotates, it might not be so simple to connect new device 100 above the axis 31 of the needle, along a line which is normal to the plane of rotation of the needle, and above the axis of rotation of the needle.

The first required step is attaching the device's base by adhesive tape or other means to the cover of the dashboard, at the correct location. In one embodiment, in order to place the device's base correctly with adhesive tape, some or all of the following steps can be performed:

1. The covers of the adhesive tape on the base are taken off.

2. The device's means for generating marks by light, which may help place the device at the best location on the dashboard, is turned on.

3. Based on the illuminated light on the speedometer which the user directs to the axis of the needle, the user slowly moves the device towards the dashboard.

4. The user moves the angle of the base in relation to the device, so that the device would be normal to the needle's plane of rotation, as required and then the device is glued above the speedometer's needle axis; or, the base is loosened so that it can move freely and the device is slowly moved towards the dashboard to the same point above the needle, then the base is moved so that it will be glued to the dashboard as required while the device is pointing to the needle's axis as described.

The device needs to be physically connected to the dashboard just once. There is no need to relocate the device on the dashboard in order to re-configure or set it up.

5. The device is now placed at proper location and can be vertically aligned as well. End.

The light beam generation means, as described in FIG. 1, may project light straight ahead, as shown in FIG. 19. Alternatively the light beam may perform any other shape of the illuminated area, such as elongated spot in order to help placing the device in the right horizontal angle.

FIG. 20 illustrates a possible embodiment of positioning alignment of the device. There may be more than one spot, as shown in FIG. 20, allowing noticing the spots more easily and easier installing of the device. The light beam generation means may be placed anywhere at the device. Light beam generation means can also help for testing the device and focusing on relevant areas of the speedometer by the device or by the user.

It will be recognized that the foregoing is but one example of an apparatus and method within the scope of the present invention and that various modifications will occur to those skilled in the art upon reading the disclosure set forth hereinbefore.

Thus persons skilled in the art will appreciate that the present invention is not limited to what has been particularly shown and described hereinabove. Rather the scope of the present invention is defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A digital monitoring device for monitoring an analog gauge including a pointer, the digital monitoring device comprising:

a pixilated optical sensor array selected from the group consisting of a rectangular array of pixels and a curved array comprising at least one curved row of pixels, for mounting over the analog gauge to generate a digital signal corresponding to position of the pointer;

a processing means for reading the position of the pointer of the analog gauge from the electrical signals from the pixilated array, and an alert output for outputting an alert corresponding to pointer exceeding acceptable boundaries.

2. The digital monitoring device of claim 1 further comprising a power source for powering the pixilated optical sensor array, processing means and alert output.

3. The digital monitoring device of claim 1 further comprising an attaching means for attaching the digital monitoring device to the window of the analog gauge.

4. The digital monitoring device of claim 3, said attaching means being selected form the group consisting of vacuum suckers, glues, adhesive tapes, screws, bolts and rivets.

5. The digital monitoring device of claim 1 further comprising a directing means for the pixilated optical sensor array to image the pointer of the gauge.

6. The digital monitoring device of claim 5, said directing means for varying angle of tilt between the pixilated array with respect to the needle of the analog gauge.

7. The digital monitoring device of claim 1 further comprising a means for locating the digital monitoring device over the pivot of the pointer of the analog gauge.

8. The digital monitoring device of claim 1 further comprising a display for facilitating installment, adjustment and calibration of the digital monitoring device.

9. The digital monitoring device of claim 8 said display for providing an indication of alignment selected from the list of audio and visual indications.

10. The digital monitoring device of claim 1, the pixilated array comprising a CMOS device.

11. The digital monitoring device of claim 1, further comprising optical lens for projecting light signal from analog gauge onto the pixilated array.

12. The digital monitoring device of claim 1, wherein the processing means comprising a DSP.

13. The digital monitoring device of claim 1, wherein the processing means comprises a threshold value storage means and a decision means for generating an output responsive to movement of said pointer.

14. The digital monitoring device of claim 1, wherein the image processing means include storage means for storing a plurality of threshold values and decision means for activating an output responsive to the pointer.

15. The digital monitoring device of claim 1 further comprising a light source, wherein calibration and alignment of digital monitoring device is facilitated by position of light from said light source reflected from said analog gauge.

16. The digital monitoring device of claim 1 further comprising a further including input means for calibration thereof by inputting thresholds.

17. The digital monitoring device of claim 16, wherein the threshold values are settable using pushbuttons on the device.

18. The digital monitoring device of claim 16, wherein the threshold values are set to be equal to the location of the pointer.

19. The digital monitoring device of claim 16, wherein the threshold values are set by projecting a light spot at the analog gauge.

20. The digital monitoring device of claim 16 further comprising a transceiver coupled to a data-link and the threshold values are remotely entered over the data-link.

21. The digital monitoring device of claim 1 further comprising a microphone for activation by an audible activation system.

22. The digital monitoring device of claim 1 further comprising ON/OFF controls.

23. The digital monitoring device of claim 1 further comprising a rotatable LED for illuminating the analog gauge for calibration and setting sector limits.

24. The digital monitoring device of claim 1 further comprising means for updating limits of pointer corresponding to allowable range of monitored parameter using a communication channel.

25. The digital monitoring device of claim 1 further comprising means for reaching a decision regarding the activation of an output signal.

26. The digital monitoring device of claim 1, said output signal selected from the list of audible alarms, visual indications and spoken word.

27. The digital monitoring device of claim 1, said output signal being outputted by an electronic signaler selected from the list of LEDs, LCDs and buzzers.

28. The digital monitoring device of claim 1 for connecting to at least one analog gauge of a vehicle to serve as a passive cruise control system.

29. The digital monitoring device of claim 1 further comprising a transceiver and a data link.

30. The digital monitoring device of claim 26 further comprising a means for reaching a decision regarding activation of the transceiver.

31. The digital monitoring device of claim 1 further comprising a memory and a means for reaching a decision regarding the storage of data in said memory.

32. The digital monitoring device of claim 1 wherein said alert is activated for a fixed predefined time period.

33. The digital monitoring device of claim 32 wherein the alert operates as long as the pointer is above a minimum threshold.

34. The digital monitoring device of claim 32 for monitoring rate of movement of the pointer for monitoring derivative of monitored parameter with respect to time.

35. The digital monitoring device of claim 1, further including a thermometer.

36. The digital monitoring device of claim 35, further comprising a cutoff for stopping operation of the device if temperature recorded by the thermometer exceeds range defined by preset limits.

37. The digital monitoring device of claim 1, including a device identification code.

38. The digital monitoring device of claim 37, the device identification code being related to registration number of a host vehicle.

39. The digital monitoring device of claim 1, further including a means for monitoring its location with respect to the analog gauge.

40. The digital monitoring device of claim 1, wherein movement of the pointer past a set point causes the digital monitoring device to perform a self testing routine that includes a battery test.

41. The digital monitoring device of claim 40, further comprising a means of alerting regarding status of battery.

42. The digital monitoring device of claim 1, further including power saving means.

43. The digital monitoring device of claim 42 said power saving means comprising at least one of the list of:
  (a) means for changing scan rate to use a slower rate when the pointer indicates that monitored parameter is distanced from preset threshold value;
  (b) a variable rate of image scan and signal processing;
  (c) means for entering a low power consumption mode of the device when the pointer of the analog gauge is not monitorable;
  (d) entering a low power consumption mode when ambient light is below a minimum threshold;
  (e) a vibration or movement sensor for switching device on and off.

* * * * *